(12) United States Patent
Kitaura et al.

(10) Patent No.: US 8,773,534 B2
(45) Date of Patent: Jul. 8, 2014

(54) IMAGE PROCESSING APPARATUS, MEDIUM RECORDING IMAGE PROCESSING PROGRAM, AND IMAGE PROCESSING METHOD

(75) Inventors: Asako Kitaura, Kawasaki (JP); Seiya Shimizu, Kawasaki (JP); Eishi Morimatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 245 days.

(21) Appl. No.: 13/242,480

(22) Filed: Sep. 23, 2011

(65) Prior Publication Data

US 2012/0033077 A1 Feb. 9, 2012

Related U.S. Application Data

(63) Continuation of application No. PCT/JP2009/057431, filed on Apr. 13, 2009.

(51) Int. Cl.
*H04N 7/18* (2006.01)
*G06T 7/00* (2006.01)

(52) U.S. Cl.
CPC .................. *G06T 7/0065* (2013.01)
USPC ........................................ 348/148

(58) Field of Classification Search
CPC .................................. G06T 7/0065
USPC ........ 348/42, 47, 61, 113, 118, 143, 148, 149
See application file for complete search history.

(56) References Cited

U.S. PATENT DOCUMENTS

| | | | | |
|---|---|---|---|---|
| 5,410,345 A | * | 4/1995 | Eichenlaub | 348/59 |
| 5,850,352 A | * | 12/1998 | Moezzi et al. | 345/419 |
| 6,278,466 B1 | * | 8/2001 | Chen | 345/473 |
| 7,307,655 B1 | | 12/2007 | Okamoto et al. | |

(Continued)

FOREIGN PATENT DOCUMENTS

| | | |
|---|---|---|
| EP | 2 150 054 A1 | 2/2010 |
| JP | 3286306 | 5/2002 |

(Continued)

OTHER PUBLICATIONS

International Search Report for PCT/JP2009/057431 mailed Jul. 7, 2009.

(Continued)

*Primary Examiner* — Christopher S Kelley
*Assistant Examiner* — Jonathan Messmore
(74) *Attorney, Agent, or Firm* — Staas & Halsey LLP

(57) ABSTRACT

A device has a unit acquires photograph images taken by a first and a second camera; a unit sets correspondences between positions in a first photograph image, in a first display image, in a second photograph image, and in a second display image on the basis of a first photographic line-of-sight from the first camera, a line-of-sight in the first display image based on the first photograph image, a second photographic line-of-sight from the second camera, and a line-of-sight in the second display image based on the second photograph image; and a unit generates the first display image based on correspondence with the first photograph image, generates a third display image by interpolating between the first display image and the second display image based on correspondence with the first photograph image or the second photograph image, and generates the second display image based on correspondence with the second photograph image.

17 Claims, 24 Drawing Sheets

(56) References Cited

U.S. PATENT DOCUMENTS

| | | | |
|---|---|---|---|
| 7,340,162 B2* | 3/2008 | Terre et al. | 396/275 |
| 7,873,207 B2* | 1/2011 | Tsubaki | 382/154 |
| 2008/0309668 A1* | 12/2008 | Borovikov | 345/427 |
| 2010/0201829 A1* | 8/2010 | Skoskiewicz et al. | 348/211.2 |

FOREIGN PATENT DOCUMENTS

| | | |
|---|---|---|
| JP | 2005-311666 | 11/2005 |
| JP | 2008-148112 | 6/2008 |
| JP | 2008-148113 | 6/2008 |
| JP | 2008-301091 | 12/2008 |

OTHER PUBLICATIONS

Open GL Architecture Review Board, "Open GL Programming Guide", Fifth Edition, Version 2, in Japanese, 2006, pp. 354, 355, 364, 365, 416, 417, 432, 433.

Open GL Architecture Review Board, The Official Reference Document to OpenGL, Version 1.1, in Japanese, 2006, pp. 8, 9, 12, 13.

* cited by examiner

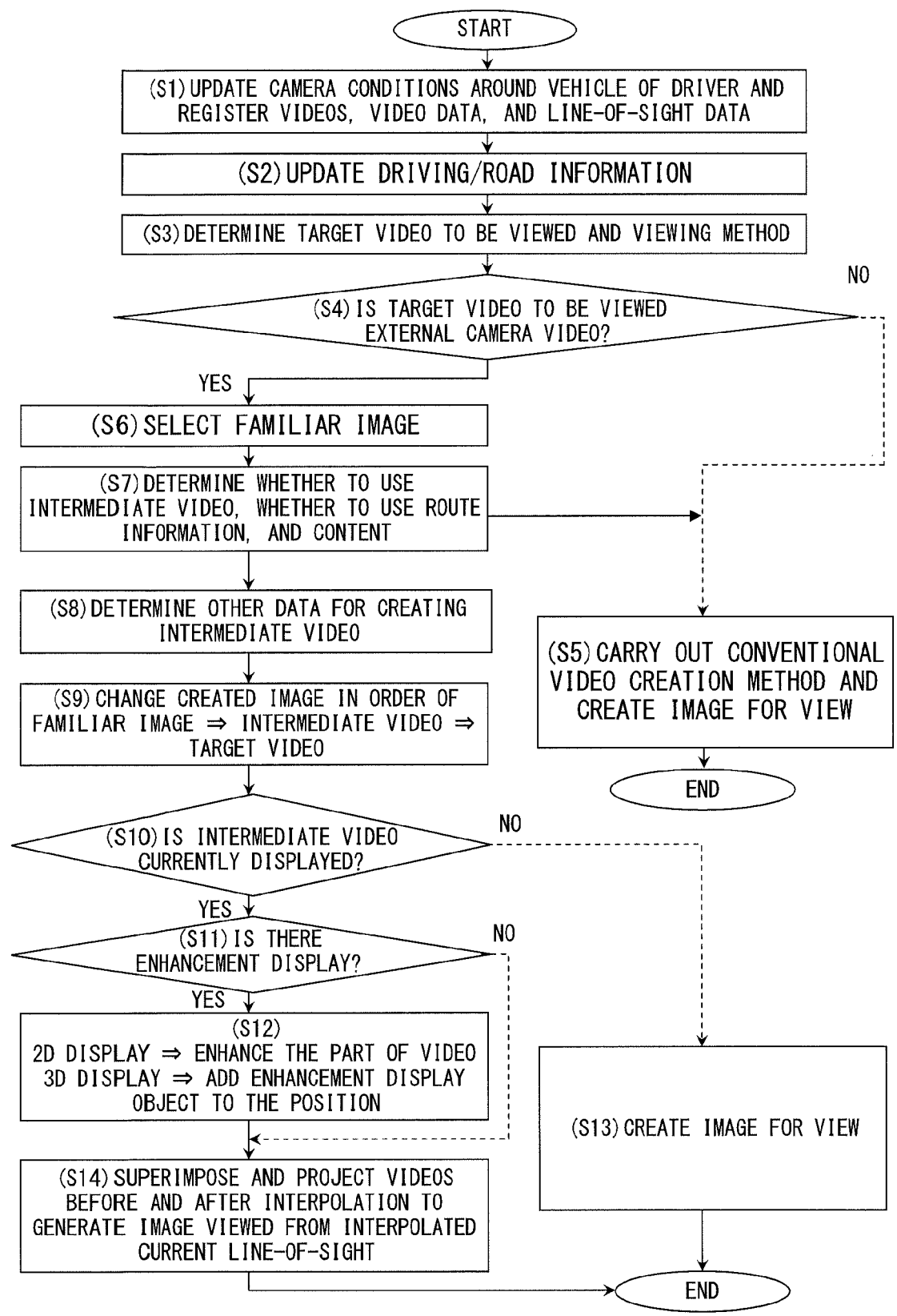
F I G. 5

| ITEM | DETERMINATION STANDARD | EXAMPLE OF DETERMINATION |
|---|---|---|
| C1 DIFFERENCE IN VIDEO IMAGING INFORMATION (LINE-OF-SIGHT DATA) | WHETHER DIFFERENCE IN VIEWING AREA BETWEEN TARGET VIDEO AND FAMILIAR IMAGE IS LARGE = ESTIMATE EXISTENCE CONDITION OF SAME SUBJECTS | CALCULATE PROPORTION OF IMAGING AREA, WHICH IS ESTIMATED FROM CAMERA IMAGING LINE-OF-SIGHT DIRECTION VECTOR AND IMAGING ANGLE OF VIEW OF TARGET VIDEO, INTERSECTING VIEWING IMAGE, WHICH IS ESTIMATED FROM LINE-OF-SIGHT VECTOR AND ANGLE OF VIEW OF FAMILIAR IMAGE, AND CALCULATE INTERSECTION STATE. IF INTERSECTION AREA IS SMALLER THAN THRESHOLD AND IT IS DETERMINED THAT THERE ARE FEW COMMON SUBJECTS ⇒ DO NOT USE INTERMEDIATE VIDEO OR USE INTERMEDIATE VIDEO USING ROUTE VIDEO AND LINE-OF-SIGHT IF INTERSECTION AREA IS GREATER THAN THRESHOLD ⇒ USE INTERMEDIATE VIDEO |
| C2 DIFFERENCE IN VIDEO IMAGING INFORMATION (LINE-OF-SIGHT DATA) | WHETHER DIFFERENCE IN LINE-OF-SIGHT DIRECTION BETWEEN TARGET VIDEO AND FAMILIAR IMAGE IS LARGE = ESTIMATE DIFFERENCE IN VISIBILITY OF SAME SUBJECTS | COMPARE CAMERA IMAGING LINE-OF-SIGHT DIRECTION VECTOR OF TARGET VIDEO AND LINE-OF-SIGHT VECTOR OF FAMILIAR IMAGE. IF ANGLE FORMED BY LINE-OF-SIGHT VECTOR IS GREATER THAN PREDETERMINED VALUE, IT IS DETERMINED THAT DIFFERENCE IN VISIBILITY IS LARGE ⇒ USE INTERMEDIATE IMAGE |
| C3 SURROUNDING ENVIRONMENT STATE | MANY OBSTACLES AROUND VEHICLE OF DRIVER / GENERAL ROAD WITH NARROW TRAVELLING PATH / HIGH-ACCIDENT LOCATION | IF IT IS ESTIMATED THAT THE NUMBER OF VIDEO SUBJECTS IS LARGE BASED ON OBSTACLE SENSOR DETECTION RESULT / TRAVELLING ROAD TYPE / CONGESTION CONDITION OF TRAVELLING ROAD / DATA OF TRAVELLING ROAD ⇒ USE INTERMEDIATE VIDEO |
| C4 DRIVING CONDITION OF VEHICLE OF DRIVER | DURING LOW-SPEED TRAVELLING | IF IT IS DETERMINED THAT URGENCY OF TARGET VIDEO DISPLAY IS LOW BASED ON SPEED OF VEHICLE OF DRIVER ⇒ USE INTERMEDIATE VIDEO |

F I G. 6

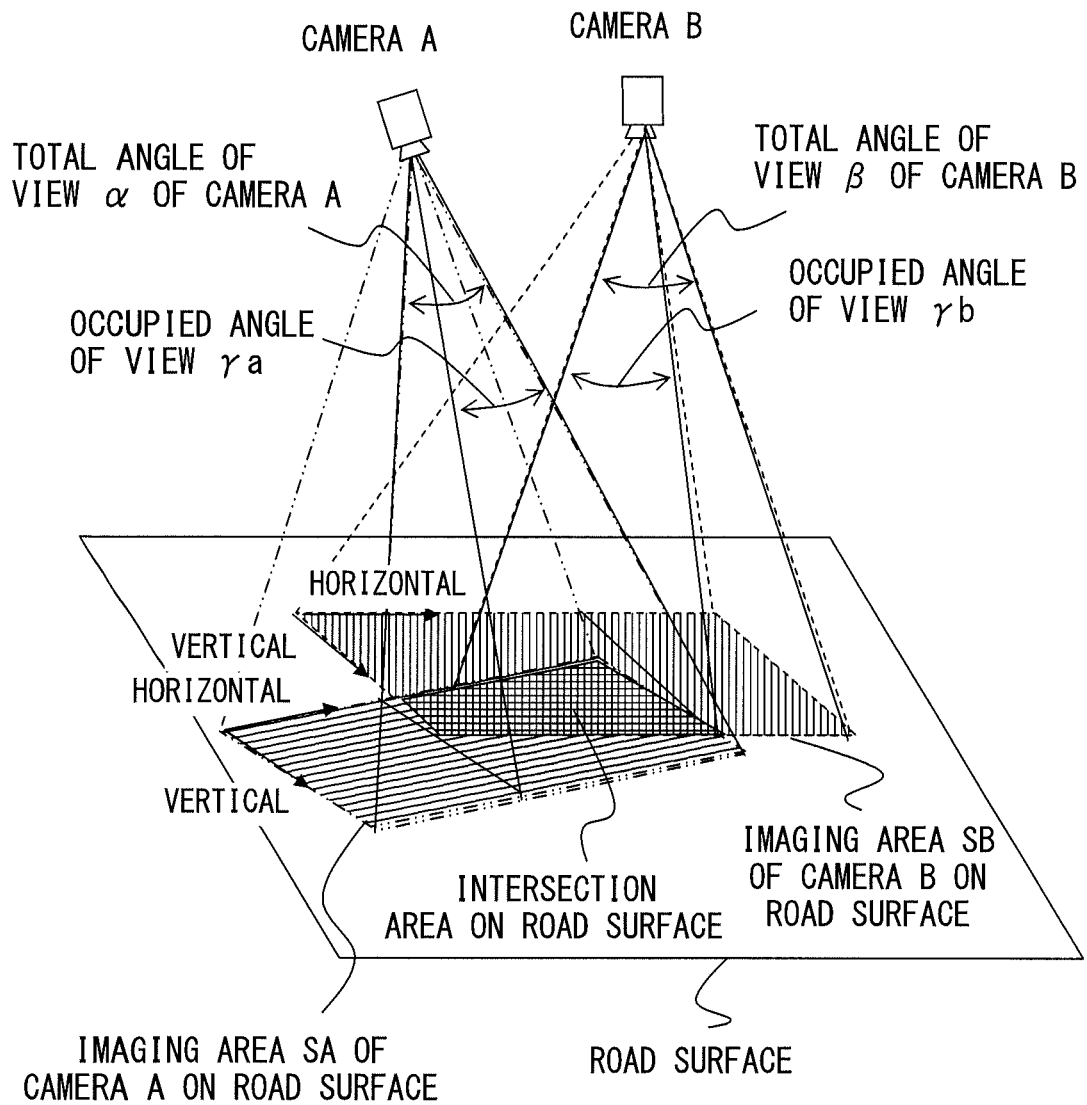
F I G. 7

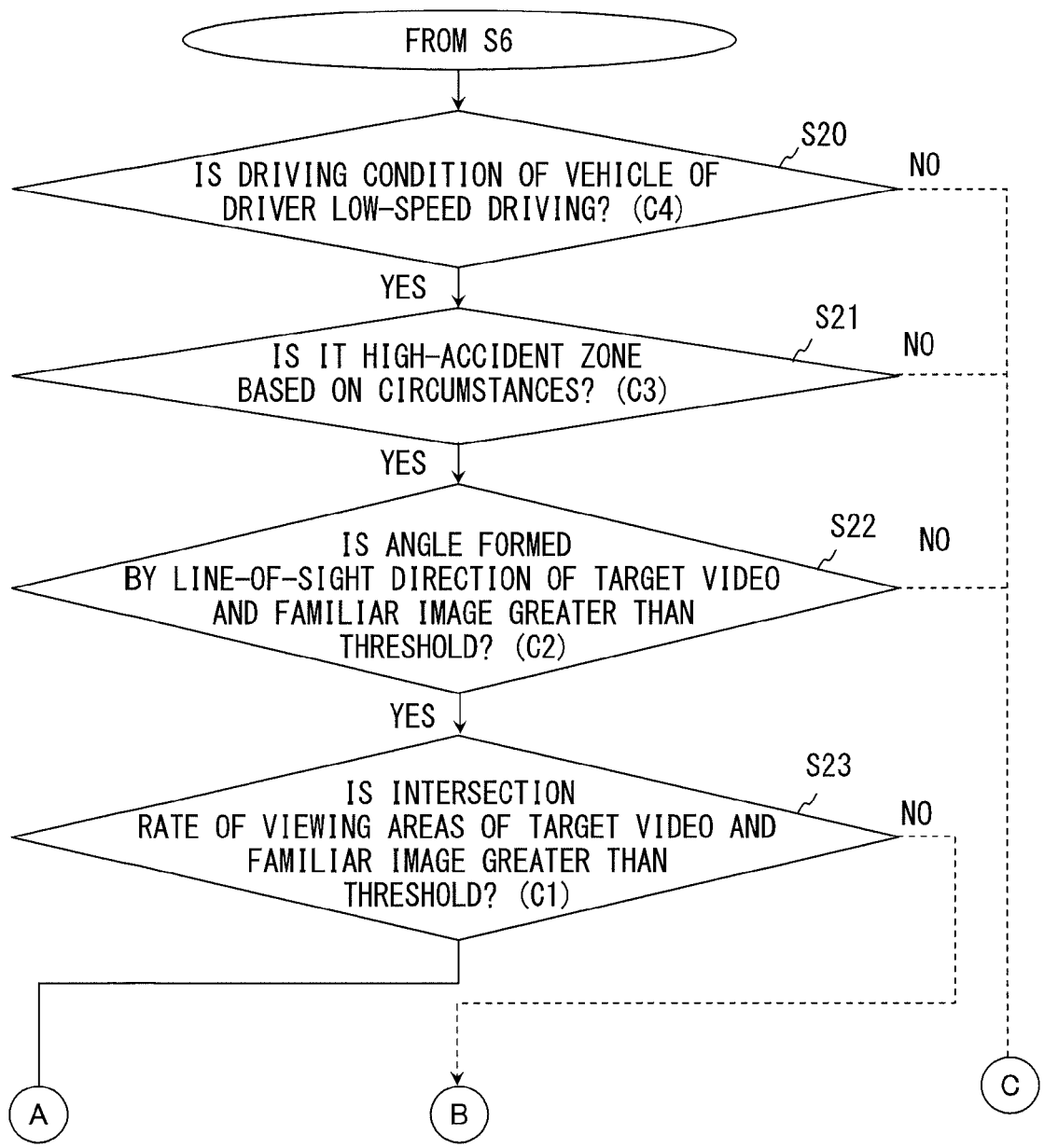
F I G. 1 0 A

FIG. 15

WITHOUT ENHANCED SHAPE 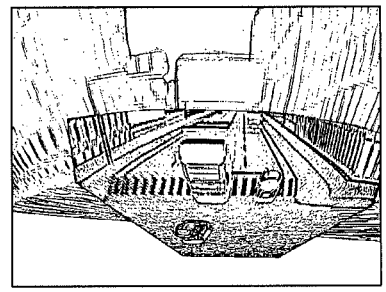
WITH ENHANCED SHAPE 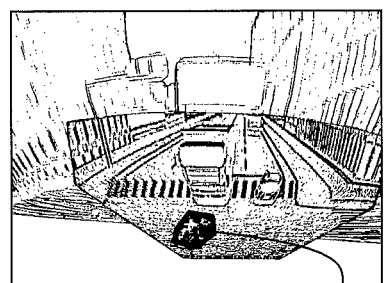
ENHANCED SHAPE
(VEHICLE OF DRIVER)
F I G. 1 9

WITHOUT ENHANCED SHAPE 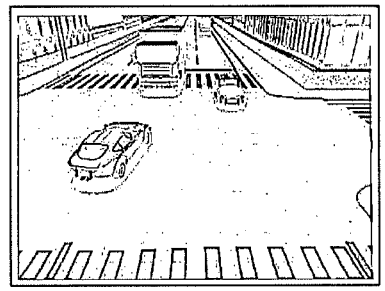
WITH ENHANCED SHAPE 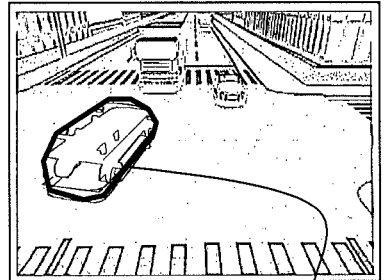
ENHANCED SHAPE
(VEHICLE OF DRIVER)
F I G. 2 0

WITHOUT ENHANCED SHAPE 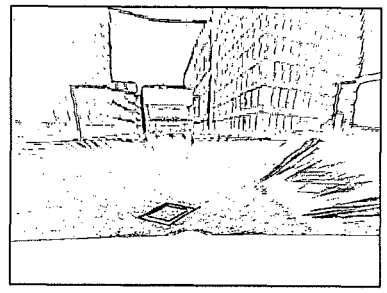
WITH ENHANCED SHAPE 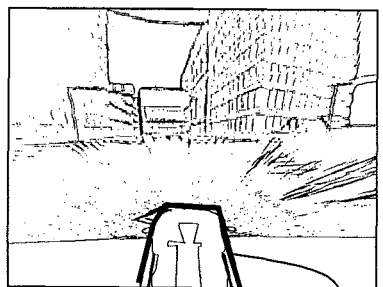
ENHANCED SHAPE
(VEHICLE OF DRIVER)
F I G. 2 1

IMAGE PROCESSING APPARATUS, MEDIUM RECORDING IMAGE PROCESSING PROGRAM, AND IMAGE PROCESSING METHOD

CROSS-REFERENCE TO RELATED APPLICATIONS

This application is a continuation of PCT application PCT/JP2009/057431 which was filed on Apr. 13, 2009, the entire contents of which are incorporated herein by reference.

FIELD

The present invention relates to an image processing apparatus, an image processing program, and an image processing method arranged on a vehicle to process images taken by cameras.

BACKGROUND

In order for a driver of a vehicle to visually check the surrounding environment of the vehicle, there is a system in which an on-vehicle apparatus converts on-vehicle camera images, which are images taken by a plurality of on-vehicle cameras, to overlooking images and synthesizes and displays the overlooking images to allow the driver to objectively and intuitively grasp the circumstances of the vehicle. To expand the system, there is, for example, an image generating apparatus that maps color information of the on-vehicle camera images in a three-dimensional space model and that displays the model by converting the model to an image viewed from an arbitrary viewpoint (for example, see Patent Document 1). The use of the image generating apparatus has an advantage that images that allow simultaneously viewing all surrounding images including the sky can be generated in addition to the overlooking images looking down on the vehicle of the driver.

Meanwhile, depending on the driving scene, not all circumstances of the vehicle of the driver can be checked based only on the on-vehicle camera images mounted on the vehicle of the driver and the images generated by converting the on-vehicle camera images. For example, when the driver waits for a right turn at an intersection of a plurality of lanes, the line-of-sight is blocked by a right-turn waiting vehicle of the opposite lane. The driver may not be able to see an opposing through-traffic vehicle passing through the side of the right-turn waiting vehicle, and the on-vehicle cameras of the vehicle of the driver may not be able to image the opposing through-traffic vehicle. In view of the situations, there is an attempt examined in Driving Safety Support Systems (DSSS), and so on, based on road-vehicle cooperation, in which, for example, a video of an infrastructure camera installed at an intersection, and so on, is wirelessly transmitted to a vehicle to display the video received by the vehicle to allow the driver to visually check the blind spot.

The video taken outside the vehicle of the driver is usually not processed and is displayed by utilizing an on-vehicle monitor.

There is also a technique of video texture in computer graphics (CG) (for example, see Non Patent Document 1, Non Patent Document 2).

Patent Document 1: Japanese Patent No. 3286306
Non Patent Document 1: OpenGL Architecture Review Board, "OpenGL Programming Guide", Pearson Education
Non Patent Document 2: OpenGL Architecture Review Board, "OpenGL Reference Manual", Pearson Education

SUMMARY

An object of the present invention is to provide an image processing apparatus, an image processing program, and an image processing method for assisting a user to recognize display images during switching of cameras.

An embodiment of the present invention provides an image processing apparatus arranged on a vehicle, the image processing apparatus including: an image acquisition unit that acquires camera images taken by each of multiple cameras including a first camera and a second camera; a setting unit that sets a correspondence between a position in a first camera image, a position in a second camera image, a position in a first display image, and a position in a second display image on the basis of a first camera line-of-sight that is a line-of-sight of the first camera image taken by the first camera, a first display line-of-sight that is a line-of-sight of the first display image generated based on the first camera image, a second camera line-of-sight that is a line-of-sight of the second camera image taken by the second camera, and a second display line-of-sight that is a line-of-sight of the second display image generated based on the second camera image; and a generating unit that generates the first display image based on the first camera image and the correspondence, generates an interpolation display image displayed later than the first display image by interpolating between the first display image and the second display image based on at least one of the first camera image and the second camera image and the correspondence, and generates the second display image displayed later than the interpolation display image based on the second camera image and the correspondence, wherein the lines-of-sight of at least one of a pair of the first camera line-of-sight and the first display line-of-sight and a pair of the second camera line-of-sight and the second display line-of-sight are different from each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a flow chart showing an example of an operation of the drive supporting apparatus according to the present embodiment;

FIG. 6 is a diagram showing intermediate video use determination methods;

FIG. 7 is a diagram showing a first calculation method of intersection rate in an intermediate video use determination method C1;

FIGS. 10A and 10B are a flow chart showing an example of an operation of the intermediate video use determination methods;

FIG. 15 is a diagram showing an image group VD obtained by video merging;

FIG. 19 is a diagram showing a result of a first enhancement method for an image in which an external camera A video and a camera B video are projected in a projection shape;

FIG. 20 is a diagram showing a result of the first enhancement method for an image in which the external camera A video is projected in a projection shape;

FIG. 21 is a diagram showing a result of the first enhancement method for an image in which the camera B video is projected in a projection shape;

DESCRIPTION OF EMBODIMENTS

Camera parameters, such as a camera position, a direction, and an imaging angle of view, depend on the camera that has taken images. Therefore, there is a problem that it is difficult for a driver to quickly figure out the content of a temporarily viewed video, such as a video taken by the infrastructure camera, particularly the positional relationship between displayed subjects and the vehicle of the driver. More specifically, a landscape for which the driver is familiar with the positional relationship, such as a landscape that the driver is currently viewing with naked eyes, and a landscape of the displayed video, such as a landscape of a video taken by the infrastructure camera (hereinafter, may also be described as "infrastructure video") installed at an intersection, are significantly different. Therefore, there is a problem that it takes time for the driver to understand the content of the infrastructure video.

For example, cameras can be installed on traffic lights as installation locations of infrastructure cameras at intersections. In this case, the installation positions of the traffic lights are different at each intersection, and the positions of the imaging cameras and imaging spaces, such as imaging directions, are different at each intersection. Therefore, every time the on-vehicle apparatus receives and displays videos at different intersections, the driver cannot instantaneously determine where the camera is facing, where is the actual location of the obstacle in the video, what is the current positional relationship between the obstacle and the vehicle of the driver, and so on. This applies not only to a case in which videos of the infrastructure cameras installed on the road are wirelessly received and used, but also to a case in which videos taken by other vehicles are wirelessly received and used. Particularly, the positions of the other vehicles that provide the videos, the camera installation positions of the vehicles, and so on, change from moment to moment, and the driver cannot immediately understand the content.

A comparative example of an embodiment of the present invention will be described first.

Comparative Example

A case in which a driver supporting apparatus, which is configured to project one or more on-vehicle camera videos in a predetermined three-dimensional shape to generate and display an image viewed from a predetermined viewing line-of-sight, displays an external video other than the on-vehicle cameras, such as an infrastructure video, will be considered in the comparative example. In the display of the external video, the external video is usually completely separated from processed images around the vehicle of the driver using the on-vehicle camera videos, and the external images are simply switched and displayed on a display. Therefore, a generation method of the processed images using the on-vehicle camera videos will be mainly described here in detail.

Figure 1:
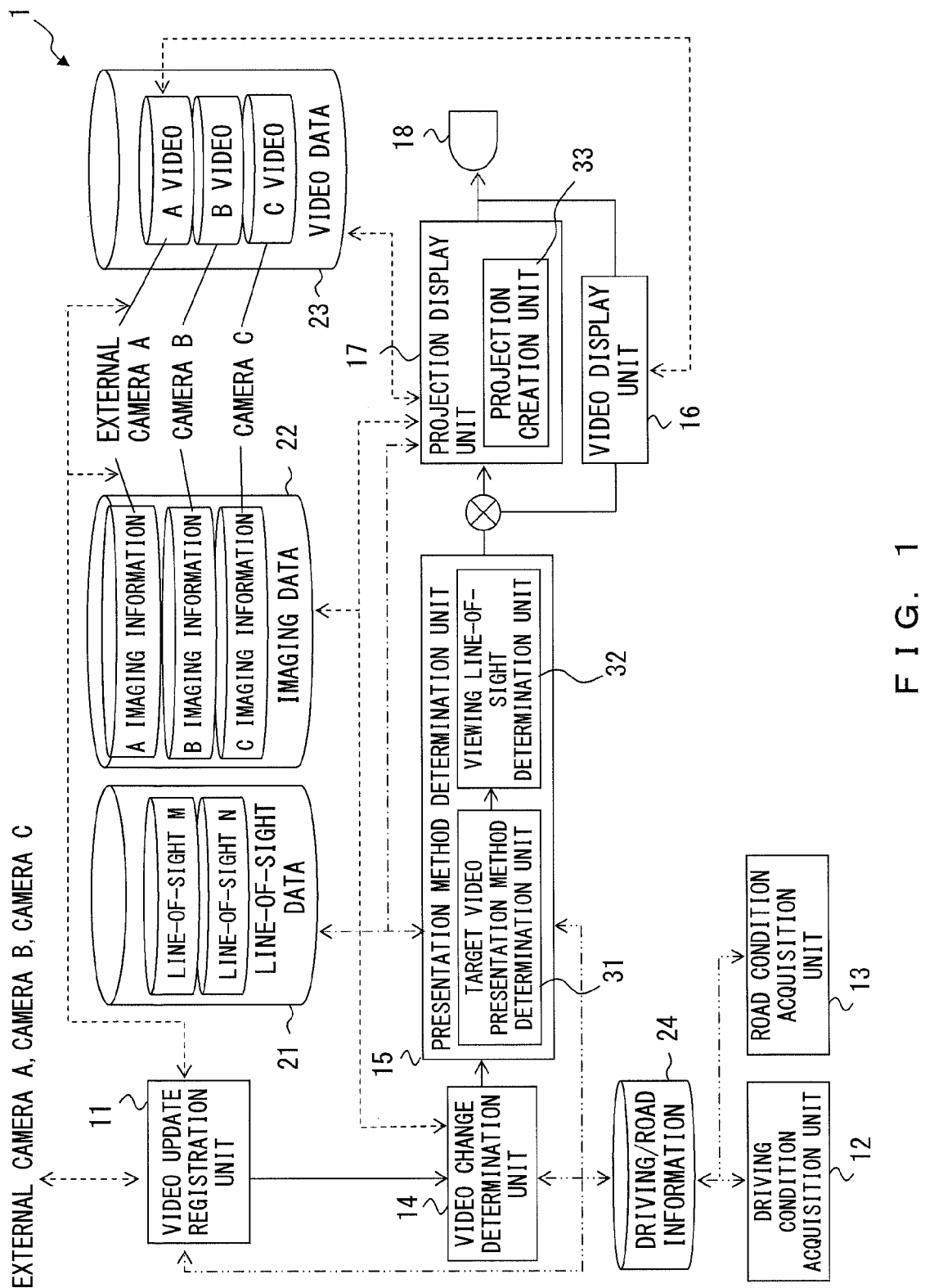
FIG. 1 is a block diagram showing a configuration of a drive supporting apparatus in a comparative example.

FIG. 1 is a block diagram showing a configuration of a drive supporting apparatus according to the comparative example.

In FIG. 1, a drive supporting apparatus 1 according to the comparative example includes a video update registration unit 11, a driving condition acquisition unit 12, a road condition acquisition unit 13, a video change determination unit 14, a presentation method determination unit 15, a video display unit 16, a projection display unit 17, a display 18, a line-of-sight data storage unit 21 that stores line-of-sight data, an imaging data storage unit 22 that stores imaging data, a video data storage unit 23 that stores video data, and a driving/road information storage unit 24 that stores driving/road information. The presentation method determination unit 15 includes a target video presentation method determination unit 31 and a viewing line-of-sight determination unit 32. The projection display unit 17 includes a projection creation unit 33. The components will be sequentially described.

The video update registration unit 11 mainly uses wireless data communication means to check whether there is a camera video that can be obtained around the vehicle of the driver (for example, at an intersection that the vehicle is passing through). If there is a video, the video update registration unit 11 acquires the camera video to register the camera video in the video data storage unit 23 and acquires imaging information related to the camera video to register the imaging information in the imaging data storage unit 22. An external camera A is a camera other than cameras B and C mounted in advance on the vehicle of the driver. The external camera can be any camera that requires use check other than the camera that is a basis of the drive supporting apparatus. A camera that takes an infrastructure video, a camera mounted on another vehicle, or a wireless camera arbitrarily attached at a predetermined location of the vehicle of the driver may be assumed as the external camera. The video update registration unit 11 registers video data (external camera A video) from the external camera A and imaging information (imaging information A) from the external camera A.

Although the video update registration unit 11 may register, as video data, all videos determined to be receivable based on radio wave conditions, the video update registration unit 11 may scrutinize the imaging information of external cameras if there are a multiplicity of external camera videos to determine whether to actually register the videos in the video data. For example, rough hints of images, such as whether the video is a video of a camera mounted on another vehicle, an infrastructure video, a public video for supporting right turns at an intersection, or an individual video, may be included in advance in the imaging information, and the video update registration unit 11 may determine whether to register the videos in the video data based on the hints. The video update registration unit 11 registers as many video materials (camera videos) as possible as video data, and the video change determination unit 14 described later uses the vehicle state or driving scene obtained from the driving condition acquisition unit 12 and the road condition acquisition unit 13 to select a video to be actually used. The video update registration unit 11 may make the selection at the registration and limit the video materials to some extent in the registration.

Examples of the imaging information include a variety of information, such as an imaging position, an imaging direction, an imaging angle of view, and a focal length as camera parameters, distortion correction information of an imaged video generated from a depth of field, the number of pixels, a frame rate, a lens distortion, and so on, a type of imaging camera (such as whether the camera is a movable body and whether the camera is an infrared camera or a visible camera), imaging time, an ID of imaging camera, a comment, and a video compression system. For the simplification, the video data held by the video data storage unit 23 is not the imaged camera video, but is video data, in which the distortion caused by the lens distortion of the camera video, and so on, is corrected by the video update registration unit 11 using the distortion information in the imaging information. The correction is not essential, and for example, the projection creation unit 33 or the video display unit 16 described below may perform the correction at a predetermined video processing timing. The correction may also be skipped.

In the comparative example, there are, in addition to the external camera A, the cameras B and C that are mounted on the vehicle of the driver to image the surroundings of the vehicle of the driver. Video data of the cameras B and C (camera B video and camera C video) and imaging information of the cameras (camera B imaging information and camera C imaging information) are also registered in the same way.

The line-of-sight data stored in advance in the line-of-sight data storage unit 21 includes lines-of-sight that are used by the projection display unit 17 described below and that are for viewing a three-dimensional world. The line-of-sight data includes at least parameters, such as viewpoints, line-of-sight directions, angles of view, and focal lengths equivalent to the angles of view, and the line-of-sight data can be assumed as part of imaging information of a virtual camera for viewing when the virtual camera takes images of the three-dimensional world. The line-of-sight data may be general viewing line-of-sight data for viewing images to support the drive, and the data includes predetermined lines-of-sight, such as a line-of-sight looking down the vehicle of the driver from above the vehicle, a line-of-sight looking forward in the travelling direction from an oblique angle of the vehicle of the driver, a line-of-sight looking backward from the front of the vehicle of the driver, and a line-of-sight diagonally overlooking in the travelling direction of the vehicle of the driver from above the back side of the vehicle. It is preferable to cover and hold in advance the viewing line-of-sight data to be used by the drive supporting apparatus (lines-of-sight M and N). The line-of-sight data is not limited to the prepared line-of-sight data, and the content of the line-of-sight data may be appropriately corrected or changed.

The driving condition acquisition unit 12 and the road condition acquisition unit 13 determine whether driving conditions and road conditions have changed, respectively, and acquire driving information and road information indicating driving operations to the vehicle of the driver, respectively, if the conditions are changed. The driving information includes driving operations (information related to the drive of the vehicle), such as a speed and a travelling direction of the vehicle of the driver that can be acquired from a vehicle speed sensor, a gyroscope, gears, and so on, as well as running straight, turning right or left, and backing away that can be acquired from a handle, gears, a turn signal, and so on. The road information is, for example, information that can be acquired from a wireless communication device that performs car navigation or inter-vehicle communications, and the information includes a road shape, a road type, an urban area type, congestion conditions, road information, and map information of stores, and so on (information related to the roads around the vehicle), that are acquired from a map database, a GPS, and so on, along with the position of the vehicle of the driver. The vehicle of the driver may directly acquire the road shape or obstacles from a sensor, such as a millimeter-wave sensor and a laser sensor.

The driving/road information acquired by the driving condition acquisition unit 12 and the road condition acquisition unit 13, particularly the road information acquired by the road condition acquisition unit 13, is used to determine the video to be used by the video change determination unit 14 described below or for the presentation method determination unit 15 to determine the viewing line-of-sight. One or both of the driving condition acquisition unit 12 and the road condition acquisition unit 13 may be eliminated if the user of the driver supporting apparatus 1 explicitly makes the determinations.

The video change determination unit 14 selects a video (described as "target video") to be viewed by the driver from the video data based on the determinations using the information obtained from the driving condition acquisition unit 12 or the road condition acquisition unit 13 or based on a direct instruction by the user. If the installation of the camera, such as the infrastructure camera, and wireless transmission of imaged videos are not generalized, there may be only few external camera videos. If an external camera video is registered, the external camera video is preferentially selected and displayed. More specifically, the video change determination unit 14 preferentially selects the registered external camera video when the external camera A is registered. If all registered videos are videos of the cameras mounted on the vehicle of the driver, and so on, and the external camera video is not detected, one or more videos of the held videos of the cameras mounted on the vehicle of the driver are selected from the driving scene estimated from the driving/road information, and so on.

The presentation method determination unit 15 determines how to display the target video determined by the video change determination unit 14 at a predetermined display area of the display 18 of the drive supporting apparatus 1. The target video presentation method determination unit 31 determines, as a selection of display method, a presentation method of video by generating and displaying images viewed from a predetermined line-of-sight (viewing line-of-sight) by projecting the video in a predetermined three-dimensional shape in a virtual three-dimensional space (processed display) or by displaying the target video without processing (unprocessed display). Other existing processing methods of the target video may be included in the selections. However, only a video processing method using a projection shape by the projection display unit 17 and a presentation method by the video display unit 16 without processing as an example of another presentation method that are related to the description of the embodiment of the present invention will be described. As described, the projection display unit 17 is involved if the presentation method is the processed display, and the video display unit 16 is involved if the presentation method is the unprocessed display.

If the determination by the target video presentation method determination unit 31 is the processed display involving the projection display unit 17, the viewing line-of-sight determination unit 32 references an estimated driving scene, and so on, to select a predetermined viewing line-of-sight to be used by the projection display unit 17 from the line-of-sight data group. Specifically, how the processes of the presentation method determination unit 15 are determined based on what kind of video will be described with a specific example.

For example, if the target video determined by the video change determination unit 14 is an external camera video, the target video presentation method determination unit 31 selects the video display unit 16 for the display without processing as the presentation method. As a result, an external video, such as an infrastructure video provided by the driving safety support systems based on the road-vehicle cooperation of the DSSS, can be switched and displayed.

If the target video is not an external camera video, or for example, if the target video is a video mounted on the vehicle of the driver, the cameras mounted on the vehicle of the driver are often wide-angle cameras that can generally take images of wide surrounding areas of the vehicle with a small number of cameras. Therefore, the obtained video is likely a video with a large distortion such as a fisheye lens. There is also a demand for viewing a plurality of camera videos at the same time. Therefore, since the videos are not suitable for the viewing, the presentation method of processing by the projection display unit 17 is set, and the viewing line-of-sight determination unit 32 estimates the driving scene of the vehicle of the driver from the current driving/road information to select line-of-sight data for viewing. For example, typical lines-of-sight include a line-of-sight that views in the travelling direction during normal travelling, a line-of-sight that views in the travelling direction from the left and right rear of the vehicle of the driver to check for the hitting during right and left turns, and a line-of-sight that looks down from above the vehicle of the driver during backing away and parking. However, the methods of determining the viewing line-of-sight from the driving scene are not limited to these, and other methods may be used to determine other lines-of-sight.

In the case of the unprocessed display, the video display unit 16 outputs the target video to the display 18 as it is to display the target video at a predetermined display area of the display 18. The unprocessed display denotes that the target video is displayed and presented in substantially the same way as the original. Simple processing, such as cutting out part of the target video to expand or shrink the target video, may be executed, and the target video does not have to be precisely displayed as it is.

The projection display unit 17 is a processing unit that executes more complicated processing than the video display unit 16. The projection display unit 17 uses pixel colors and luminance of each frame of the video to determine the pixel colors and luminance of the display area in the display to actually instruct the display. As described, the projection creation unit 33 executes video processing using the projection shape.

The projection creation unit 33 provides the camera B that has taken a video in a virtual space, a predetermined three-dimensional shape for attaching the video, and a viewing line-of-sight M for viewing the virtual space and generates a video based on a similar process as in a general video texture of computer graphics (CG). Details of the technique are as described in a multiplicity of documents, such as OpenGL Architecture Review Board, "OpenGL Programming Guide", Pearson Education and OpenGL Architecture Review Board, "OpenGL Reference Manual", Pearson Education. A virtual space including, for example, the center of the vehicle of the driver as an origin is defined as a common three-dimensional coordinate system for arranging the viewing line-of-sight and the projection shape. More specifically, the projection creation unit 33 uses the imaging position, direction, angle of view, focal length, the number of pixels, and so on, of the camera B obtained from the imaging information B to specify the imaging area in the virtual space imaged by the video. Based on the imaging area as well as the position and the shape of the three-dimensional shape, the projection creation unit 33 calculates the correspondence between a feature point of the three-dimensional shape and a pixel position of the video frame.

The correspondence is equivalent to a correspondence between the texture and the coordinates of the attached shape in the texture mapping in the CG.

Figure 2:
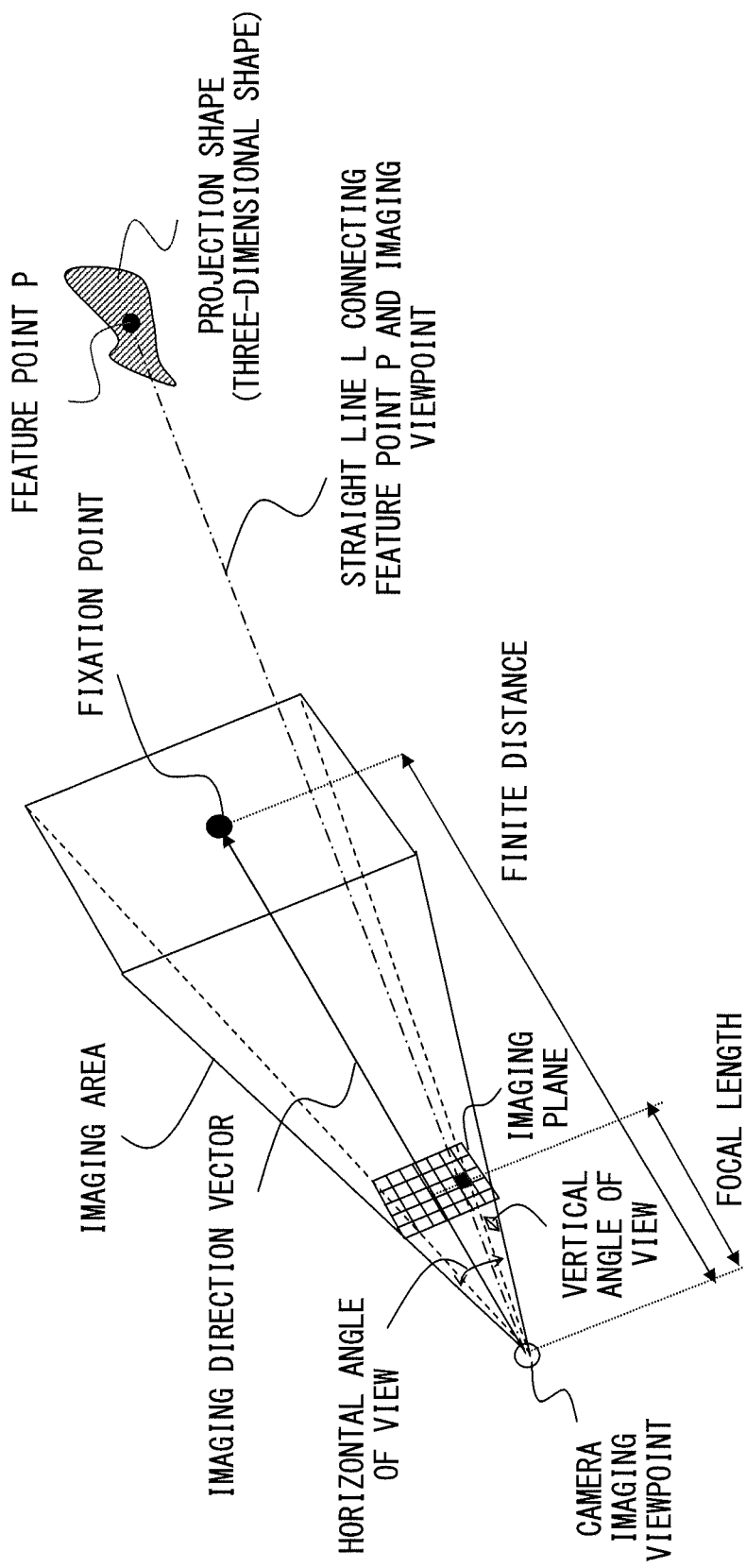
FIG. 2 is a diagram showing an association between an imaging area and an imaging plane.

FIG. 2 is a diagram showing an association between an imaging area and an imaging plane.

FIG. 2 illustrates, in a perspective projection, positional relationships between the imaging area and the imaging plane of the camera that has imaged the video and between the camera and the three-dimensional shape that is a projection shape. The imaging viewpoint serves as the vertex, and an area, which is obtained by cutting a quadrangular pyramid extending corresponding to the angle of view in a fixation point direction, i.e. toward an imaging direction vector, with the imaging plane as a cutting surface, serves as the imaging area. The imaging area is finite and is from the camera imaging viewpoint to a plane at a finite distance. A feature point in the three-dimensional shape is designated with P, and a straight line connecting the camera imaging viewpoint and the feature point P is expressed as a straight line L.

Figure 3:
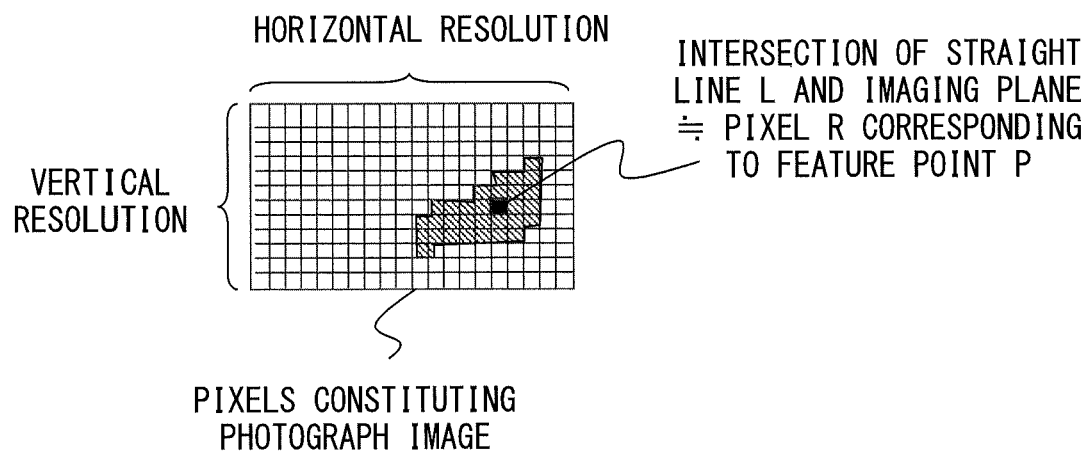
FIG. 3 is a diagram showing an association between the imaging plane and the photograph image.

FIG. 3 is a diagram showing an association between the imaging plane and a photograph image.

FIG. 3 is a diagram showing an association between the imaging plane of the camera shown in FIG. 2 and a photograph image and shows an example of a photograph image taken at the imaging plane. A pixel corresponding to the intersection of the straight line L and the imaging plane of FIG. 2 is a pixel R in the photograph image, and the pixel R corresponds to the feature point P. The number of pixels, the focal length, and the horizontal angle of view determine the horizontal resolution of the photographed image, while the number of pixels, the focal length, and the vertical angle of view determine the vertical resolution of the photographed image.

The projection creation unit 33 determines whether the straight line L extended from the feature point P of the three-dimensional shape in the virtual space to the imaging viewpoint of the imaging camera intersects with the imaging plane that is apart from the imaging viewpoint of the imaging camera by the focal length. The projection creation unit 33 then converts the intersected position in the imaging plane into a pixel position obtained by quantizing the imaging plane by the resolution of the camera to acquire the pixel R of the image corresponding to the imaging plane. As a result, the projection creation unit 33 obtains the correspondence between the coordinate values in the virtual world of the feature point P and the pixel position R of the video. The calculation is an example, and the association based on the search in the opposite direction is also possible, such as by determining whether the straight line L passing from the imaging viewpoint of the imaging camera through the position of an arbitrary pixel on the photograph image, for example the pixel R, on the imaging screen intersects with the three-dimensional shape to obtain the feature point P as the intersection.

For the simplification, although the projection creation unit 33 uses the pixel corresponding to the actual resolution as the pixel position for the association, a pixel that does not actually exist, i.e. a logical pixel position including a decimal point, may be used. In the case of the camera mounted on the vehicle of the driver in which the camera position and the imaging direction are fixed to the vehicle, there is no change in the imaging area of the camera in the virtual space including the vehicle of the driver as the origin. Therefore, the correspondence is invariable if there is no change in the positional relationship between the shape of the projected three-dimensional shape and the vehicle of the driver. In this case, the projection creation unit 33 does not have to calculate the correspondence every time the video frame is rewritten. If the correspondence can be estimated in advance based on the vehicle type, and so on, the projection creation unit 33 may prepare and use a numerical value table (such as a mapping table) without calculating the correspondence every time.

The projection creation unit 33 forms an association in the opposite direction using a similar perspective projection as the projection from which the association is calculated using the information of the viewing line-of-sight after the calculation of the correspondence and calculates an image looking the virtual space from the viewpoint, in the line-of-sight direction, and at the angle of view of the viewing line-of-sight. More specifically, the projection creation unit 33 similarly defines a virtual imaging plane of the viewing line-of-sight in the virtual space and defines a straight line from the viewpoint of the viewing line-of-sight to the pixels of the virtual imaging plane to calculate the intersection of the straight line and the tree-dimensional shape. In this way, the projection creation unit 33 uses the pixel color at the pixel position in the frame image of the video corresponding to the intersection, i.e. the pixel color of the current video frame image, to determine the pixel color and the luminance of the pixel of the virtual imaging plane.

A simple processing method is described in the determination method of the pixel color. An image displaying the projection shape provided with the target video at the viewing line-of-sight may be generated by another method. The projection creation unit 33 associates the calculated virtual imaging plane of the viewing line-of-sight with a predetermined display area on the display 18. This completes the processed display of the target video by the projection display unit 17.

An embodiment of the present invention will be described with reference to the drawings.

Embodiment

A drive supporting apparatus 1*a* to which the image processing apparatus of the present invention is applied will be described.

Figure 4:
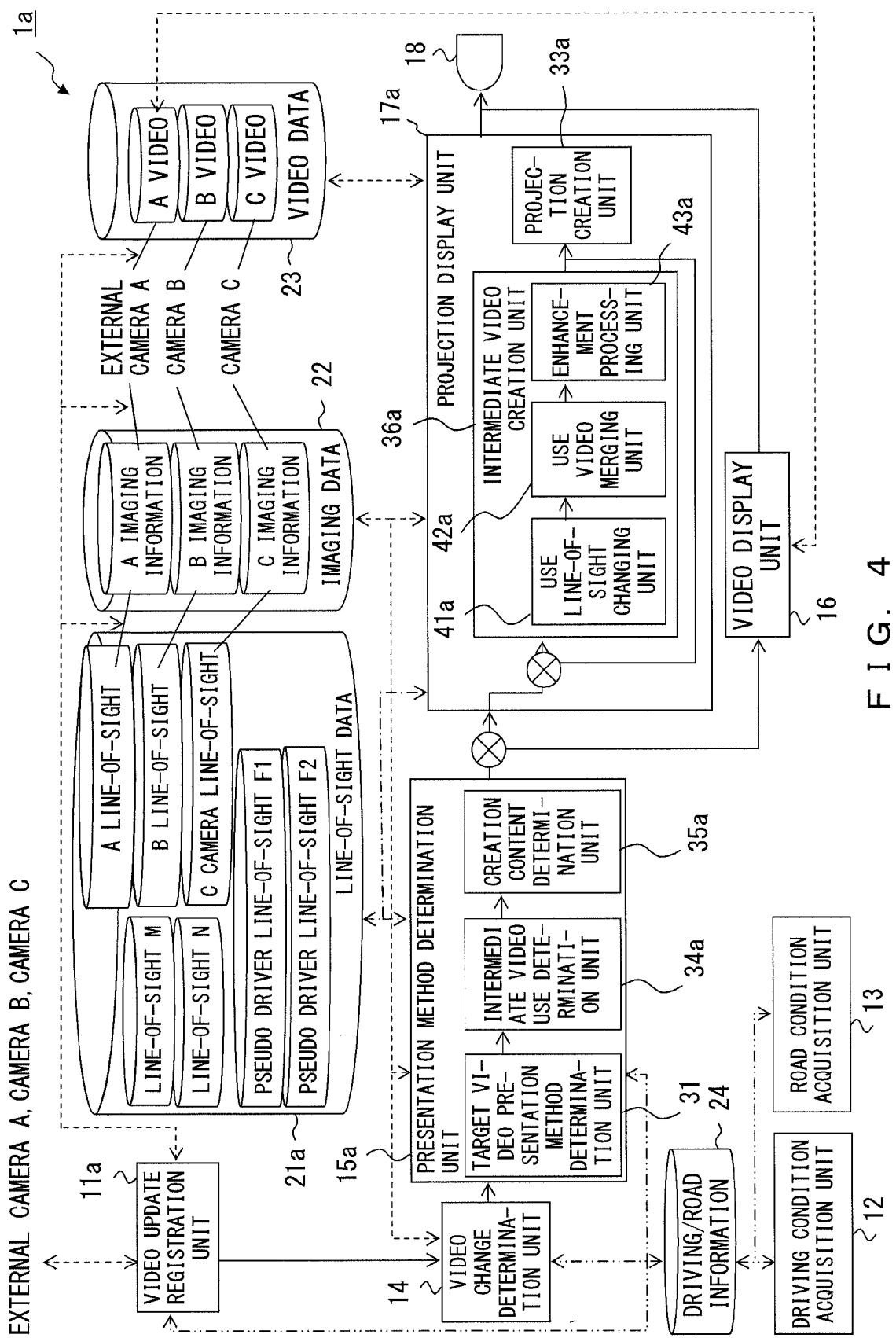
FIG. 4 is a block diagram showing a configuration of a drive supporting apparatus according to the present embodiment.

FIG. 4 is a block diagram showing a configuration of the drive supporting apparatus according to the present embodiment.

Like the drive supporting apparatus 1, the drive supporting apparatus 1*a* in FIG. 4 includes the driving condition acquisition unit 12, the road condition acquisition unit 13, the video change determination unit 14, the video display unit 16, the display 18, the imaging data storage unit 22, the video data storage unit 23, and the driving/road information storage unit 24. Compared to the drive supporting apparatus 1, the drive supporting apparatus 1*a* includes a video update registration unit 11*a* in place of the video update registration unit 11, a presentation method determination unit 15*a* in place of the presentation method determination unit 15, a projection display unit 17*a* in place of the projection display unit 17, and a line-of-sight data storage unit 21*a* in place of the line-of-sight data storage unit 21.

The presentation method determination unit 15*a* includes the target video presentation method determination unit 31, an intermediate video use determination unit 34*a*, and a creation content determination unit 35*a*. The projection display unit 17*a* includes an intermediate video creation unit 36*a* and a projection creation unit 33*a*. The intermediate video creation unit 36*a* includes a line-of-sight changing unit 41*a*, a use video merging unit 42*a*, and an enhancement processing unit 43*a*. Hereinafter, parts different from the comparative example will be mainly described with reference to FIG. 5.

FIG. 5 is a flow chart showing an example of an operation of the drive supporting apparatus according to the present embodiment.

Like the video update registration unit 11, the video update registration unit 11*a* searches a camera video that can be used around the vehicle of the driver (external camera A), registers a video (external camera A video) and image data (external camera A imaging information) in the video data storage unit 23 and the imaging data storage unit 22, respectively, and further registers information related to a photographic line-of-sight extracted from the imaging data (external camera A line-of-sight) in the line-of-sight data storage unit 21*a* as line-of-sight data. The video update registration unit 11*a* further registers imaging data (camera B imaging information and camera C imaging information) and video data (camera B video and camera C video) for the cameras B and C mounted on the vehicle of the driver other than the external camera A and registers photographic lines-of-sight (camera B line-of-sight and camera C line-of-sight) in the line-of-sight data storage unit 21*a* as line-of-sight data (S1).

The specific contents of the held video data and imaging data are the same as in the drive supporting apparatus 1. The driving condition acquisition unit 12, the road condition acquisition unit 13, and the driving/road information storage unit 24 update and hold the current driving/road information just like in the drive supporting apparatus 1 (S2). The road information is further referenced to determine the necessity of the creation of an intermediate video by the intermediate video use determination unit 34*a*, to determine the necessity of an enhancement process, and to estimate a driving scene related to various determinations.

As in the drive supporting apparatus 1, the video change determination unit 14 determines a target video that is a video related to the driving scene estimated from the driving/road information or a video directly viewed based on an instruction by the user (S3). A case in which the external camera A video, such as the infrastructure camera video, is determined as the video selected as the target video will be mainly described.

The target video presentation method determination unit 31 in the presentation method determination unit 15*a* determines the presentation method of the target video. For example, as in the drive supporting apparatus 1, the video is displayed as it is through the video display unit 16 as in the comparative example in the case of the external camera A, and a processed video viewed from an arbitrary viewing line-of-sight is displayed through the projection display unit 17a in the case of the video of the vehicle of the driver (S3).

Before displaying the target video, the intermediate video use determination unit 34a determines whether to create an intermediate video for assisting the driver to figure out the positions and locations of the subjects. The intermediate video use determination unit 34a first roughly determines whether to apply the drive supporting apparatus 1a. For example, the intermediate video use determination unit 34a determines whether the target video is the external camera video A (S4). The intermediate video use determination unit 34a determines that there is a possibility of the drive supporting apparatus 1a and moves on if the target video is the external camera video (S4, YES). The intermediate video use determination unit 34a applies the operation of the drive supporting apparatus 1 if the target video is not the external camera video (S4, NO).

The intermediate video will be described. The intermediate video is generated using an image that the driver or the viewer of the drive supporting apparatus 1a (hereinafter, called "user") would most likely be familiar with the positional relationship between the subjects at the moment (hereinafter, described as "familiar image") and using an image of the target video for which the user is not understanding the positional relationship well. The intermediate video is a video in the middle of changing the image from the familiar image to the target video. As the image is changed from the familiar image to the target video through the intermediate video, the user can understand the correspondence between the subjects based on the change in the video between the familiar image as a start image of the intermediate video and the image of the target video as an end image of the intermediate video.

An example of the familiar image that the user would likely be familiar with the positional relationship between the subjects in the image and the positional relationship between the subjects and the vehicle of the driver (user) includes an image close to the visual observation of the user. Therefore, an example of using a video of a camera mounted on the vehicle of the driver (mainly the video of the front imaging camera) and using an image based on a pseudo driver line-of-sight will be described as an example of the familiar image. Although an example of the driver among the users will be described using the pseudo driver line-of-sight for the convenience, another user may be used as an example to reread the pseudo driver line-of-sight as a pseudo user line-of-sight. An image using another video or viewing line-of-sight, such as an overlooking image overlooking the vehicle of the driver from right above and a currently viewed image, may be used as the familiar image.

The pseudo driver line-of-sight is a simulation of a line-of-sight of the naked eyes of the driver to reproduce the surrounding viewing conditions based on the naked eyes, the conditions that would likely be familiar to the driver. Therefore, unlike the camera mounted on the vehicle of the driver designed to take images by covering the blind spot that cannot be seen by the naked eyes, the pseudo driver line-of-sight does not have to be a wide angle (wide angle of view), and the angle of view can be 50 to 60 degrees that is a viewing angle of a human in gazing. A wider range can be viewed if the angle of view is greater, while the subject can be enlarged and viewed if the angle of view is smaller. For example, if the existence of many subjects can be estimated from the road conditions, a smaller angle of view is used as the pseudo driver line-of-sight.

The viewpoint of the pseudo driver line-of-sight does not have to be on the central axis of the vehicle of the driver that is used for the viewing line-of-sight as a general representative point of the vehicle of the driver. A line-of-sight close to the line-of-sight of the driver can be realized if a viewpoint shifted to the left or right from the center of the vehicle of the driver according to the position of the driver's seat of the vehicle is set as the viewpoint of the pseudo driver line-of-sight. Instead of the travelling direction of the vehicle of the driver, the line-of-sight direction of the pseudo driver line-of-sight may be the current line-of-sight direction of the driver measured by a sensor, and so on, or estimated from the height of the driver or the driving scene. Alternatively, a direction of the area that the driver would be particularly gazing at each driving scene, such as a line-of-sight direction facing the opposing through-traffic lane when the driver waits for a right turn, may be the line-of-sight direction of the pseudo driver line-of-sight. The pseudo driver line-of-sight is obtained by applying the predetermined operation as described above to the line-of-sight of the user.

There is a possibility that the pseudo driver line-of-sight is used every time the intermediate video is generated. Therefore, it is desirable that the pseudo driver lines-of-sight be patterned, registered in advance in the line-of-sight data storage unit 21a, and appropriately corrected before use. The line-of-sight data storage unit 21a registers in advance two pseudo driver lines-of-sight F1 and F2 as the pseudo driver lines-of-sight.

If S4 is YES, the intermediate video use determination unit 34a selects a familiar image for comparing the current target video and the viewing conditions familiar to the user (S6). For example, one of the pseudo driver lines-of-sight F1 and F2 close to the current line-of-sight of the driver is selected as the familiar image, and a video that images forward is selected from the videos mounted on the vehicle. Although the familiar image selected here usually serves as the base point of the intermediate video, a different familiar image may be used for the comparison.

The intermediate video use determination unit 34a uses the selected familiar image to determine whether to create the intermediate video, to determine whether to use route information described later, and to determine the route information (S7). FIGS. 10A and 10B show a flow chart as an example of the process, and FIGS. 6 to 9 will be used to describe intermediate video use determination methods.

FIG. 6 is a diagram showing the intermediate video use determination methods.

FIG. 6 shows determination standards and examples of determination of intermediate video use determination methods C1, C2, C3, and C4. Based on one of the intermediate video use determination methods C1, C2, C3, and C4, the intermediate video use determination unit 34a uses the photographic line-of-sight, and so on, to compare the contents of the familiar image and the image of the target video. In this way, if the difference between the visibilities, i.e. scenes in the videos, is large, the intermediate video use determination unit 34a determines that it is difficult for the driver to quickly figure out the position of the subjects based on simple switching of the video and determines to use the intermediate video while taking the urgency into account.

In C1, the line-of-sight direction vector and the angle of view are used as the difference between the scenes, and entire viewing/imaging areas of the familiar image and the image of the target video are estimated to check the intersection area to check the proportion of the viewing/imaging areas in the images to determine whether the same subjects are in the images.

For example, the viewpoint of the familiar line-of-sight (pseudo driver line-of-sight), the line-of-sight direction, and the angle of view are used for the entire viewing/imaging area of the familiar image to determine the viewing area. The camera viewpoint, the imaging direction, and the imaging angle of view of the camera that has imaged the target video are used for the entire viewing/imaging area of the target video. The camera imaging information of the video of the camera mounted on the vehicle of the driver, and so on, as a material of the familiar image may be used for the entire viewing/imaging area of the familiar image, or the imaging information of a plurality of cameras, such as a front camera and a side camera, may be used for the area if necessary. The imaging information and the line-of-sight information of the camera do not have to be precisely used to determine the entire viewing/imaging area.

When a processed display video using a projection display, and so on, is used as the target video instead of the video material of the external camera video A, and so on, a viewing line-of-sight of the processed display video as the target video is selected, and the line-of-sight information is used for the entire viewing/imaging area of the target video. As a result, the subsequent intermediate video use and the use determination of the intermediate video can be applied when a video viewed from an arbitrary viewing line-of-sight after projecting the video mounted on the vehicle of the driver in an arbitrary projection shape is set as the target video.

Specifically, as in the association between the imaging area and the photograph image shown in FIG. 2, the intermediate video use determination unit 34a defines a visual cone, and so on, extending across the angle of view with the viewpoint as a vertex as the viewing/imaging area to calculate the intersection area, which is typical in the drawing calculation of CG, and so on. In this case, the calculation is not possible if the area includes from the viewpoint to the infinity. Therefore, as in the clip distance of FIG. 2 and the CG drawing calculation, the area can be limited from the viewpoint to an appropriate finite distance to set the entire viewing/imaging area. Although the precise entire viewing/imaging area does not include the area from the imaging plane to the camera viewpoint (included in the focal length) as in FIG. 2, the focal length is significantly small and is a distance that can be ignored. Therefore, for the simplification, the entire viewing/imaging area may be a quadrangular pyramid including the area from the imaging plane to the camera viewpoint. Instead of the precise calculation, the intermediate video use determination unit 34a may use a cone that facilitates the calculation or may determine the intersection by a predetermined determination method.

When the intersection area is calculated, it is desirable that the intermediate video use determination unit 34a obtain, for example, the proportion of the volume and the area of the intersection area in the volume and the area of the entire viewing/imaging area and calculate the angle of view part occupied by the intersection area in the angle of view of the entire viewing/imaging area to obtain the proportion of the intersection area in the angle of view to obtain an intersection rate that is a numerical value serving as a determination index of the extent of the intersection of two videos.

FIG. 7 is a diagram showing a first calculation method of intersection rate in the intermediate video use determination method C1.

Figure 8:
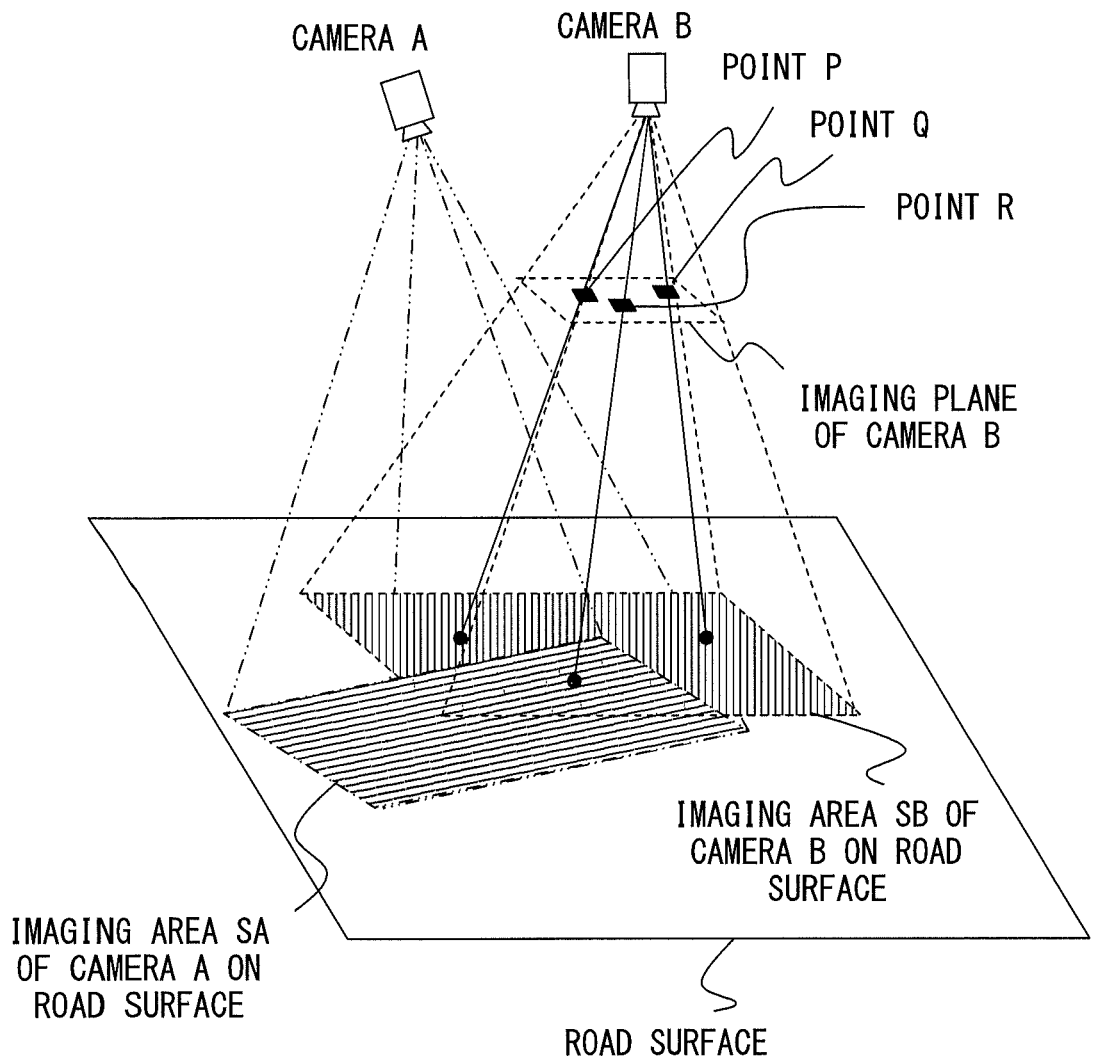
FIG. 8 is a diagram showing a second calculation method of intersection rate in the intermediate video use determination method C1.

FIG. 8 is a diagram showing a second calculation method of intersection rate in the intermediate video use determination method C1.

In the examples, quadrangular pyramids from the cameras A and B to the road surface are used, instead of using the finite distance as the viewing/imaging area.

In the first calculation method of intersection rate, an intersection area of imaging areas SA and SB (area where the imaging areas SA and SB overlap) on the road surface (shown by rectangles on the road surface) is obtained, instead of the intersection volume of the entire quadrangular pyramids. The proportion of the area of the intersection in the areas of the imaging areas SA and SB may be calculated as the intersection rate in the first calculation method of intersection rate. Angles of view (occupied angles of view γa and γb in the horizontal direction) occupied by the intersection area relative to the entire imaging angles of view of the cameras (for example, total angles of view α and β in the horizontal direction) may be calculated to calculate the occupied proportions of the angles of view (γa/α and γb/β) as the intersection rate.

Although the angle of view in the horizontal direction is calculated in the first calculation method of intersection rate, the angle of view in the vertical direction may be similarly obtained to include a plurality of intersection rates by setting the values as the intersection rates, or an average, a minimum value, a maximum value, and so on, of both values may be used to obtain one intersection rate.

The second calculation method of intersection rate is an example in which the proportion of sample points of the imaging area in the intersection area is obtained as the intersection rate, instead of directly obtaining the intersection area. More specifically, in the second calculation method of intersection rate, points (points P, Q, and R) at positions determined using random numbers, and so on, are obtained as sample points on the imaging plane (imaging plane of the camera B) of one of two camera lines-of-sight to be compared, and straight lines passing from the camera viewpoint (camera B viewpoint) through the points are simulated to calculate whether the straight lines intersect the imaging area (imaging area A of the camera A on the road surface) of the other camera. Subsequently, the second calculation method of intersection rate obtains the proportion of the intersected sample points in all sample points to set the intersection rate. Only the point R among the three sample points P, Q, and R intersects the imaging area SA of the camera A in FIG. 8 of the second calculation method of intersection rate, and the intersection rate of the camera B relative to the camera A is ⅓.

The first calculation method of intersection rate and the second calculation method of intersection rate are examples, and both the intersection rate of the camera A relative to the camera B and the intersection rate of the camera B relative to the camera A may be obtained to set respective values or a value using both values (such as an average value, a larger value, and a smaller value) may be set as the overall intersection rate. Alternatively, only one of the intersection rates may be obtained.

If there are many same subjects, i.e. if the intersection rate is greater than a threshold (S23, YES), the intermediate video use determination unit 34a creates an intermediate video using the familiar image and the target video (S27). If there are few same subjects, i.e. if the intersection rate is smaller than the threshold, the intermediate video use determination unit 34a may simply give up assisting and quit presenting the intermediate video, because it is difficult for the user to figure out the positional relationships of the subjects in the target video when only the intermediate video including the familiar image as the start image is displayed. Alternatively, whether there are other video and viewing lines-of-sight that can be used to help figuring out the positional relationship may be searched, and an intermediate video using the video and the line-of-sight (hereinafter, described as "route video" and "route line-of-sight", respectively) before displaying the target video may be created. Even if the target video includes few same subjects relative to the familiar image, the position in the target video can be quickly figured out by placing the route video and the route line-of-sight with common subjects between the target video and the familiar image. Detailed creation methods, and so on, of the route video and the route line-of-sight will be described later.

C2 is an example in which the line-of-sight direction vector is used as the difference in the scenes to compare and determine the visibility of the subjects. Even if the viewing areas overlap and the videos display the same subjects, the visibility is totally different between the video displaying the subjects from right above and the video displaying the subjects from right beside. Therefore, C2 takes into account the possibility that the same subjects may not be quickly recognized. Specifically, an angle formed by the line-of-sight direction vector is used. For example, if the angle formed by the line-of-sight direction vector is greater than 90 degrees (S22, YES), the difference in the viewing direction is large as in the videos from right above and right beside, and it is determined that some kind of assist, i.e. use of the intermediate video, is necessary to view the target video. If the positions and the existing areas of important subjects can be estimated in advance from the driving scene, C2 may perform the comparison by replacing the camera line-of-sight direction vector with an angle formed by a direction vector from the camera viewpoints of the familiar image and the target video to representative positions of the positions and the existing areas of the subjects.

C1 and C2 determine that the intermediate video needs to be used if the line-of-sight of the familiar image and the line-of-sight of the target video are separated by more than a predetermined range as described above.

Figure 9:
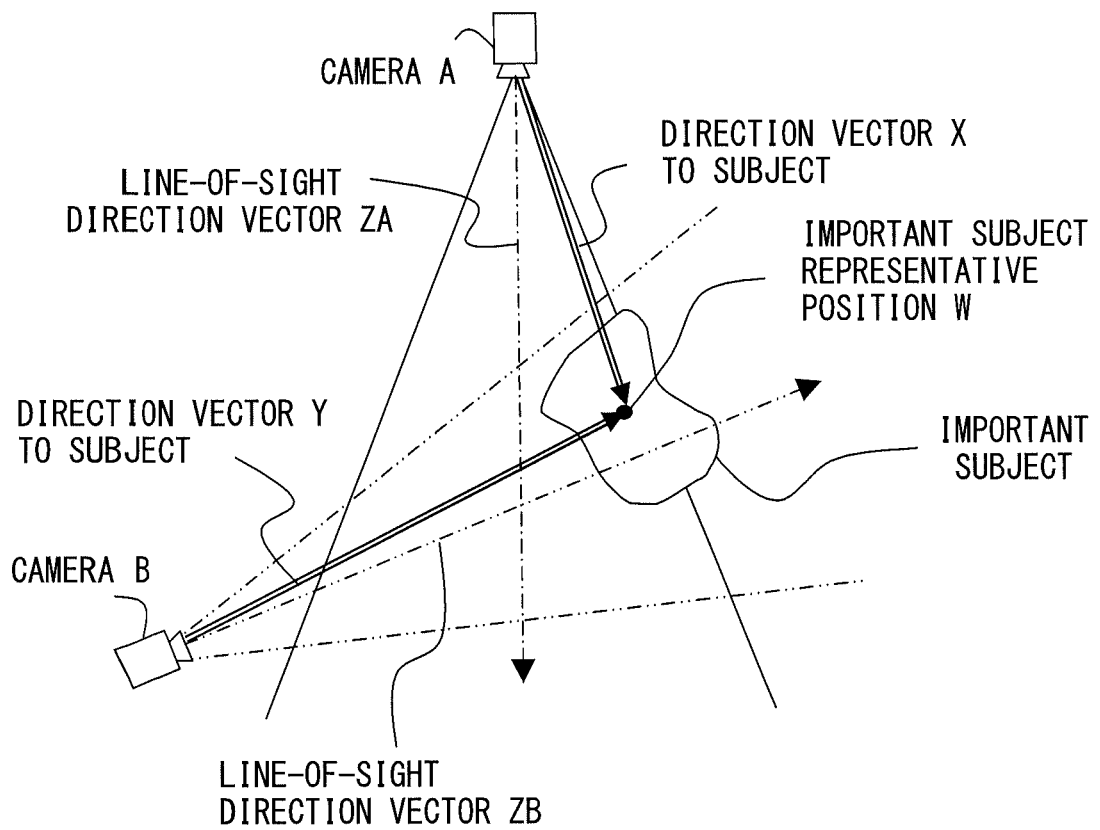
FIG. 9 is a diagram showing a comparison of appearances of a subject in an intermediate video use determination method C2.
Figure 10B:
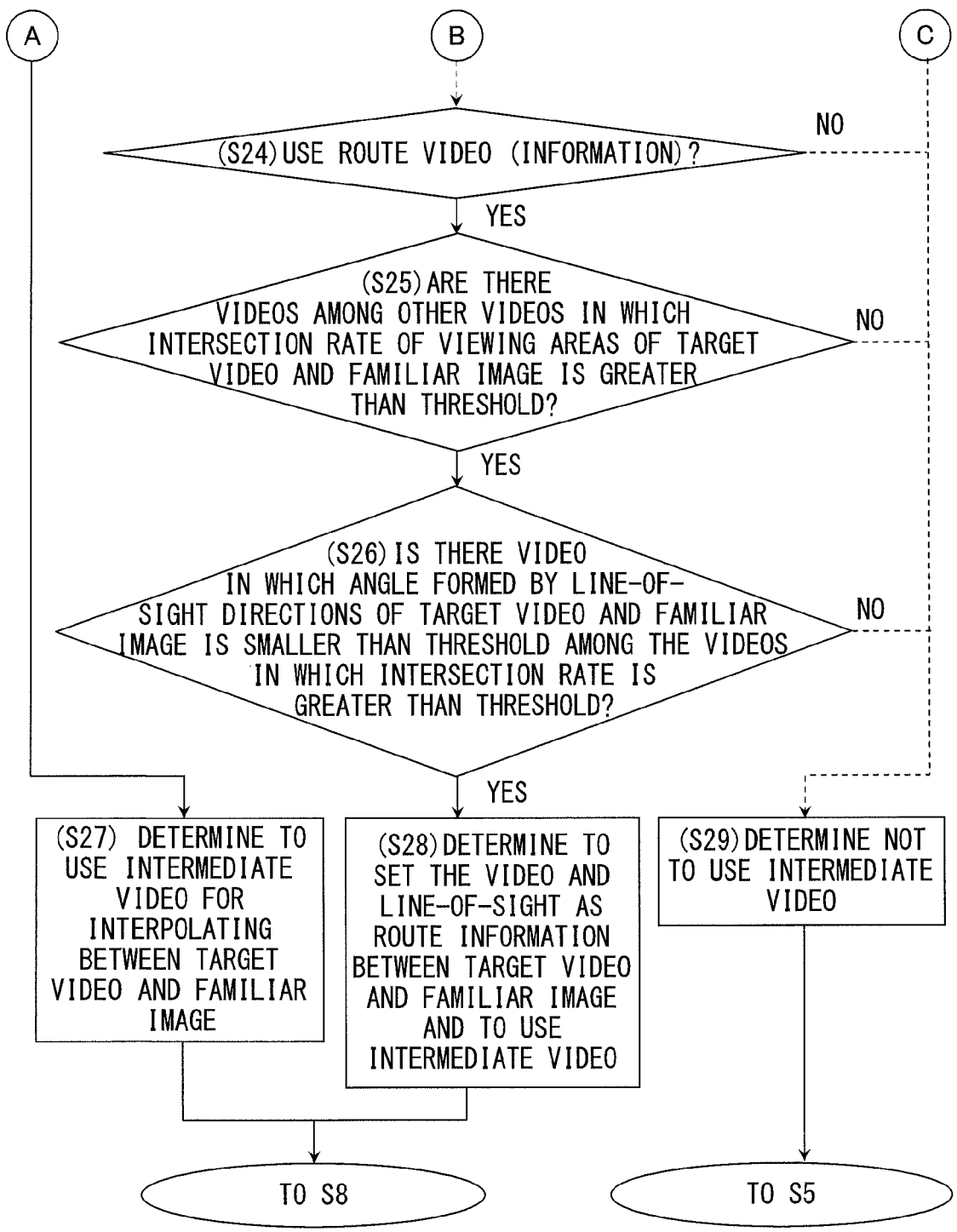

FIG. 9 is a diagram showing a comparison of appearances of a subject in the intermediate video use determination method C2.

C2 compares the appearances of the subject taken by the camera A and the camera B by comparing a direction vector X from the camera A to a representative position W of an important subject and a direction vector Y from the camera B to the representative position W of the important subject. This can determine the difference between the appearances of a subject that particularly requires attention in the familiar image and the target video, such as an opposite pass-through lane that is particularly important in a right-turn scene and an obstacle around the vehicle of the driver detected by an obstacle sensor. If there are a plurality of subjects that require attention, C2 may use vectors to the subjects to obtain angles formed by the vectors to set the average value as the difference between the appearances in the videos.

Instead of the difference between the target video and the familiar image as in C1 and C2, C3 estimates current conditions of subjects that would be displayed in the target video based on the conditions around the vehicle of the driver to determine the use of the intermediate video. C3 obtains information, such as the number of obstacles around the vehicle of the driver and the travelling location, general roads with narrow travelling roads, and high-accident locations, from road information, such as the type and the shape of the travelling road, congestion conditions of the travelling road, and accident data of the travelling road mainly acquired from the road condition acquisition unit 13, sensing results by an obstacle sensor, and so on, and takes into account the multiplicity of subjects in the target video, the location that particularly requires attention, or the fact that there is no urgency in presenting the target video to determine the use of the intermediate video (S21, YES). In the example, the travelling speed of the vehicle of the driver is expected to be high if the road type is an expressway, and C3 determines that the target video needs to be urgently viewed and determines not to display the intermediate video.

As in C3, C4 determines the use of the intermediate video from the conditions of the vehicle of the driver, not from the difference between the target video and the familiar image. For example, whether the vehicle of the driver is in low-speed travelling is determined based on driving conditions, and so on, obtained from the driving condition acquisition unit 12. If the vehicle runs at a low speed, C4 determines that the target video does not have to be urgently viewed and determines to display the intermediate video (S20, YES).

The intermediate video use determination unit 34a may determine a viewing space (highly important space) based on at least one of the driving conditions of the vehicle of the driver acquired by the driving condition acquisition unit 12 and the road conditions around the vehicle of the driver acquired by the road condition acquisition unit 13 to check intersections between the viewing space and the imaging spaces of the cameras and determine to preferentially use the video of a camera including an imaging space with a high intersection rate.

Instead of individually executing C1, C2, C3, and C4, a plurality of determination methods may be used at the same time to determine the use of the intermediate video.

FIGS. 10A and 10B are a flow chart showing an example of an operation of the intermediate video use determination methods.

The latter part of the flow chart of FIGS. 10A and 10B (S25, S26, and S28) is related to the route video, which will be described later. If the route video is not used (S24, NO), the part may be skipped to return to S5 of FIG. 5.

In the flow chart, for example, the determination of C4 which is the conditions of the vehicle of the driver is made first. If the driving conditions of the vehicle of the driver indicate high-speed drive (S20, NO), the urgency of viewing the target video is high. Therefore, it is determined not to use the intermediate video (S29), and it is determined to execute the same viewing display method as in the drive supporting apparatus 1. The process returns to S5 of FIG. 5.

Subsequently, the determinations of the conditions of the vehicle of the driver C3, the visibility of the subjects C2, and the existence conditions of the same subjects C1 are similarly made. When the circumstances do not indicate a high-accident zone (S21, NO), or when the angle formed by the line-of-sight direction vector of the target video and the familiar image is smaller than the threshold (S22, NO), or when the intersection rate of the viewing area of the target video and the familiar image is smaller than the threshold (S23, NO), it is similarly determined not to use the intermediate video (S29).

As a result, the intermediate video use determination unit 34a can determine to use the intermediate video for the target video, for which it is determined that the urgency of presenting the target video is low and that there are more than a certain number of same subjects, and for which it is determined that the visibility of the subjects is significantly different from those of the familiar image.

Like the viewing line-of-sight determination unit 32, the creation content determination unit 35a determines the viewing line-of-sight when the video is processed and displayed, i.e. when the projection display unit 17a is involved. In this case, the creation content determination unit 35a temporarily sets the presentation method to a processed display using the projection display unit 17a when the intermediate video is created through the projection display unit 17a as described below, i.e. when the intermediate video is used for the assist regardless of the presentation method of the target video determined by the target video presentation method determination unit 31. Therefore, even if the target video is an external camera video and is displayed through the video display unit 16 without processing, the creation content determination unit 35a needs to include the viewing line-of-sight of the target video and determine a variety of information used by the projection display unit 17a when the intermediate video is used.

Specific examples of the information used to create the intermediate video include the video and the viewing line-of-sight (pseudo driver line-of-sight here) used to create the familiar image, the route video and the route line-of-sight, a line-of-sight interpolation method for changing the line-of-sight, necessity of merging videos and the video merging method, necessity of enhancement display of the vehicle of the driver, the subjects, and so on, as well as the enhancement display method. The creation content determination unit 35a determines the information.

The viewing line-of-sight of the target video will be described. As described, when the intermediate video is used, the viewing line-of-sight is also necessary for the target video displayed without processing. When the external camera A is the target video, it is desirable that the viewing line-of-sight be the imaging camera line-of-sight of the target video as in the use determination of the intermediate video. For example, it is assumed that the viewing line-of-sight is an external camera line-of-sight A that is a photographic line-of-sight of the external camera A video as the target video. This is because if the projection display unit 17a that projects and displays a video in a predetermined three-dimensional shape displays the video from the photographic line-of-sight based on the same projection method as the projection to the three-dimensional shape, a projection and a back projection not related to the shape to be projected can be obtained if both are projected and displayed by the same perspective projection, and a video without projection distortion can be viewed in the same way as viewing the video as it is. Precisely, there is a minute error when a position coordinate calculation including decimal points is converted to a pixel calculation of integers. Therefore, the video is not completely the same, but substantially the same video can be viewed. As in the method described in the use determination of the intermediate video, the imaging camera line-of-sight does not necessarily have to be the viewing line-of-sight of the target video itself if the target video is not a video as a material and is a video to which some kind of processing is applied. The imaging camera line-of-sight may be reread as a predetermined viewing line-of-sight in the following description.

The flow chart temporarily returns to FIG. 5. The creation content determination unit 35a uses a line-of-sight data group including the viewing line-of-sight of the familiar image (the pseudo driver line-of-sight F1 in this example), the viewing line-of-sight of the target video (the external camera line-of-sight A), and a route line-of-sight if the use of the route line-of-sight as a line-of-sight of the route video described later (a line-of-sight M in the example described later) is determined and determines the line-of-sight interpolation method for creating the intermediate video (S8).

In the line-of-sight interpolation method, part or all of the line-of-sight data contents of two or three lines-of-sight are interpolated to gradually change the line-of-sight within a predetermined period (the number of video frames) to smoothly change the line-of-sight. The interpolated line-of-sight data includes the line-of-sight direction vector (line-of-sight position and direction), the viewing angle, and so on. In a specific calculation of the line-of-sight interpolation method, for example, a linear interpolation is used to calculate an amount of change of each line-of-sight data value per frame obtained by "difference in line-of-sight data value between lines-of-sight/the number of video frames provided for interpolation and change" to gradually add or subtract the amount of change to and from the current line-of-sight data value to create a used line-of-sight of the intermediate video in which the line-of-sight data values gradually change. As a result, the change in the line-of-sight can be realized, in which, for example, the line-of-sight data gradually changes from the pseudo driver line-of-sight F1 to the line-of-sight M and then to the external camera line-of-sight A. The line-of-sight interpolation method is an example, and other than the simple linear interpolation, a general predetermined interpolation calculation method for two or more numerical values may be used.

The video merging will be described. The creation content determination unit 35a determines whether to use a plurality of videos for the intermediate video and determines to perform video merging if the creation content determination unit 35a determines to use a plurality of videos. The creation content determination unit 35a may select not to perform the video merging in consideration of the load of the video merging process, and so on. However, videos with different visibilities of subjects suddenly switch if there is no video merging when a plurality of videos are used. Therefore, it is desirable to merge the videos to gradually change the videos in order to assist the user to figure out the positional relationship between the subjects in the video.

The video merging method uses a video group including the video used to create the familiar image (the camera B video mounted on the vehicle of the driver in this example) and the video of the target video (the external camera A video) as well as the route video if the use of the route video described later is determined (the camera B video described later). For example, in the video merging method, two videos before and after switching are used for each of two or three videos to complete the video switching in accordance with the video time (video frame) at which the viewing line-of-sight of the corresponding video is switched. The video is gradually changed in consideration of the imaging positional relationship between the videos.

Figure 11:
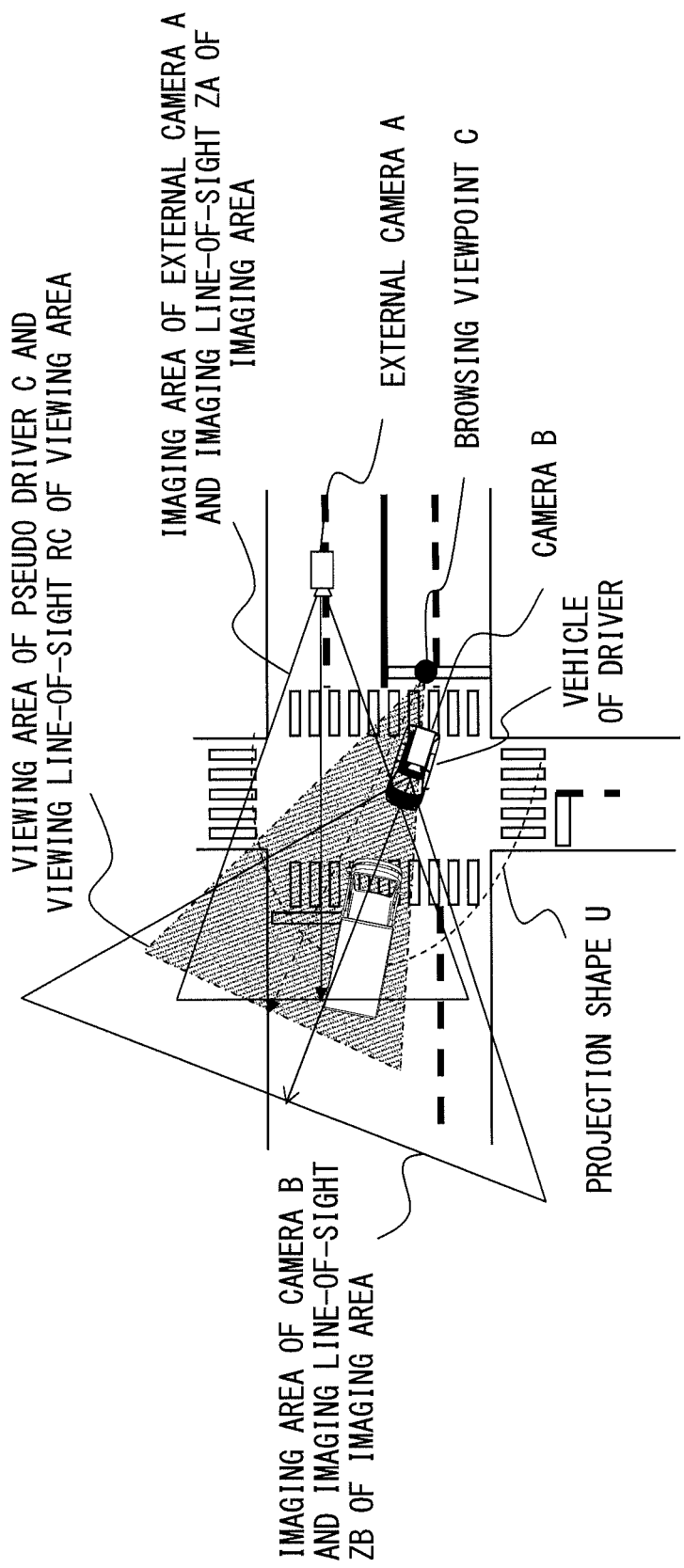
FIG. 11 is a diagram showing a video merging method.

FIG. 11 is a diagram showing the video merging method.

FIG. 11 shows camera positions and imaging areas (photographic lines-of-sight) of two videos used in the video merging, the external camera A video and the camera B video. In the video merging method, the imaging positional relationship between the videos are taken into account to merge and interpolate the two videos so that the camera B video changes to the external camera A video as the target video. More specifically, in the video merging method, actual imaging parameters (photographic lines-of-sight ZA and ZB), such as imaging positions, directions, and angles of view of the videos, are used to project the videos in a projection shape (an oval sphere U around the vehicle of the driver including the camera B) while gradually increasing and decreasing the luminance and transparency of the entire videos during the merging time, and the two videos are merged in the projection shape. A video for viewing the video merged in the projection shape from a viewing line-of-sight RC as a line-of-sight of a pseudo drive C is generated.

Figure 12:
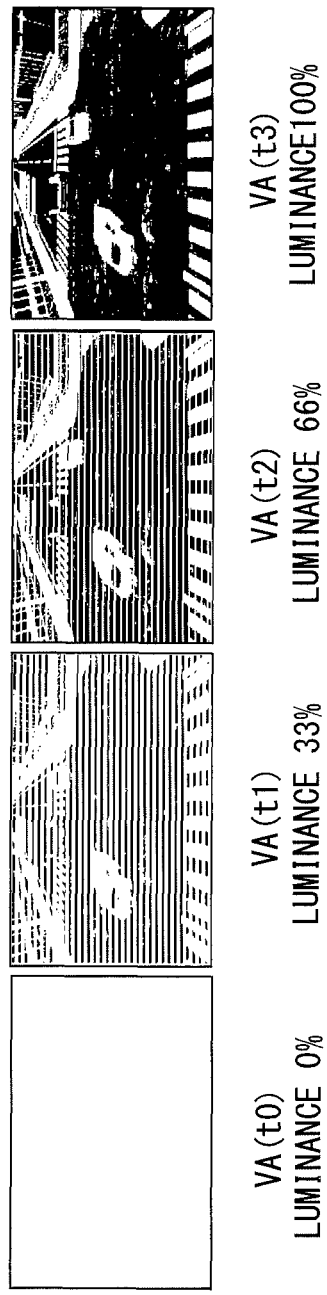
FIG. 12 is a diagram showing an image group VA for video merging.

FIG. 12 is a diagram showing an image group VA for video merging.

Figure 13:
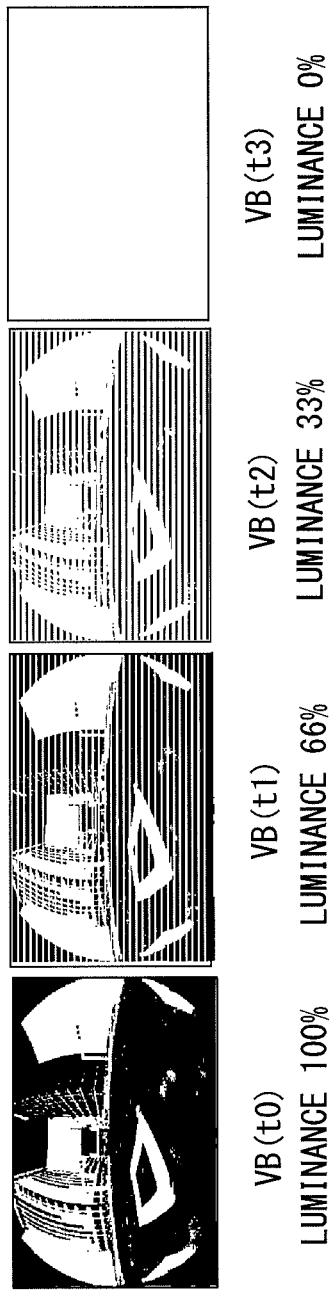
FIG. 13 is a diagram showing an image group VB for video merging.

FIG. 13 is a diagram showing an image group VB for video merging.

Figure 14:
FIG. 14 is a diagram showing an image group VC in which a video is simply switched.

FIG. 14 is a diagram showing an image group VC in which the video is simply switched.

FIG. 15 is a diagram showing an image group VD obtained by video merging.

The viewpoint is at a position a little behind the vehicle of the driver in the viewing line-of-sight here, and the viewing line-of-sight is a viewing line-of-sight C with a normal angle of view compared to the camera B which is a wide-angle video. The image group VA is an image group in which the luminance of the external camera A video is changed with time. The image group VB is an image group in which the luminance of the camera B video is changed with time. The image group VC is an image group in which the external camera A video is simply switched to the camera B video with time. The image group VD is an image group (video in the viewing line-of-sight C) as a result of the video merging of the present embodiment. The image group VA(t) includes images VA(t0), VA(t1), VA(t2), and VA (t3) at time t=t0, t1, t2, and t3. Similarly, the image groups VB(t), VC(t), and VD(t) include images at the time t=t0, t1, t2, and t3.

In the example, the video merging method gradually changes the external camera A video and the camera B video along the temporal axis so that the transparencies of the entire images are exactly opposite and sets the videos as VA and VB. More specifically, the camera video VB(t0) as the video of the familiar image is not transparent (luminance is 100%) in the start state of the intermediate video of t=t0, and the external camera video VA(t0) as the target video is completely transparent (luminance is 0%) and cannot be viewed. The video merging method gradually changes the transparency. The luminance of VB(t1) at t=t1 is 66%, and the luminance of VA(t1) is 33%. The luminance of VB(t2) at t=t2 is 33%, and the luminance of VA(t2) is 66%. In the end state (t=t3) of the intermediate video, the camera video VB(t3) is completely transparent (luminance is 0%), and the external camera video VA(t3) is not transparent (luminance is 100%). Such image groups VA and VB are projected in a projection shape from the imaging camera line-of-sight and are viewed from a predetermined viewing line-of-sight to generate the image group VD including the intermediate video.

Although the transparencies of the entire images are used to increase and decrease the transparencies of two videos at substantially the same rate in the illustrated example of the video merging method, the calculation method is not necessarily limited to this. For example, the video merging method may perform linear/nonlinear interpolations to gradually change the luminance and the pixel colors, instead of the transparency, of the two images from the values of the familiar image to the values of the target image, and the change rate during the change does not have to be constant. In the video merging method, one of the two videos may be a base video, and the other video may be a video displayed over the base video. The base video may be not transparent, and only the transparency of the video displayed over the base video may be gradually changed from transparent to not transparent to generate the intermediate video. Computations, such as addition of pixels, multiplication, AND, and OR, may be used in the transparency calculation.

In the video merging method here, the luminance, and so on, of VA and VB are weighted, and the weight of VB is reduced with time. The weight of VA is increased with time, and the weighted VA and VB are projected in the same projection shape to generate VD.

Subjects, such as an opposite track, a pass-through vehicle, an intersection mark, a crosswalk, other road surface marks, and the vehicle of the driver are displayed at significantly different positions in the external camera A video of FIG. 12 and the camera B video of FIG. 13. Therefore, the same subjects are displayed as a plurality of images at totally different positions in the image group VC in which the video is simply switched as in FIG. 14, and it is difficult to use the image group VC to assist the user in understanding the positional relationship between the subjects.

Meanwhile, the external camera A video and the camera B video are projected in consideration of the different imaging spaces in the image group VD of FIG. 15. Therefore, imaging space parts that are not in one of the images at the merge gradually appear or disappear (appearance of the surroundings of the vehicle of the driver at t2 and t3, disappearance of the sky in the front at t3, and so forth). However, as for the parts where the imaging spaces overlap in the image group VD, the same subjects are projected at substantially the same positions, because the videos projected in consideration of the imaging positions are merged. As a result of the video merging, an opposite truck vehicle can be viewed as a subject at substantially the same position in the intermediate video, and the intermediate image can be used to assist the user in understanding the positional relationship.

Route information determination methods will be described. The route information includes a route video and a route line-of-sight used to create the intermediate video. The route video is a video provided between the familiar image and the target video. The route line-of-sight is a line-of-sight provided between the familiar image and the target video. A first route information determination method, a second route information determination method, and a third route information determination method will be described as examples of the route information determination method with reference to FIGS. 16 to 18. It should be noted that, for the convenience, the camera numbers are different between FIGS. 16 to 18 and other drawings such as FIGS. 1 and 4. For example, the target video camera is the camera C in FIGS. 1 and 4, while it is described "camera C" in FIGS. 16 to 18. The latter part of the flow chart of FIGS. 10A and 10B (S25, S26, and S28) shows an example of a flow of the process for determining the content of the route information based on the first route information determination method. Therefore, FIGS. 10A and 10B will also be used in the description.

Figure 16:
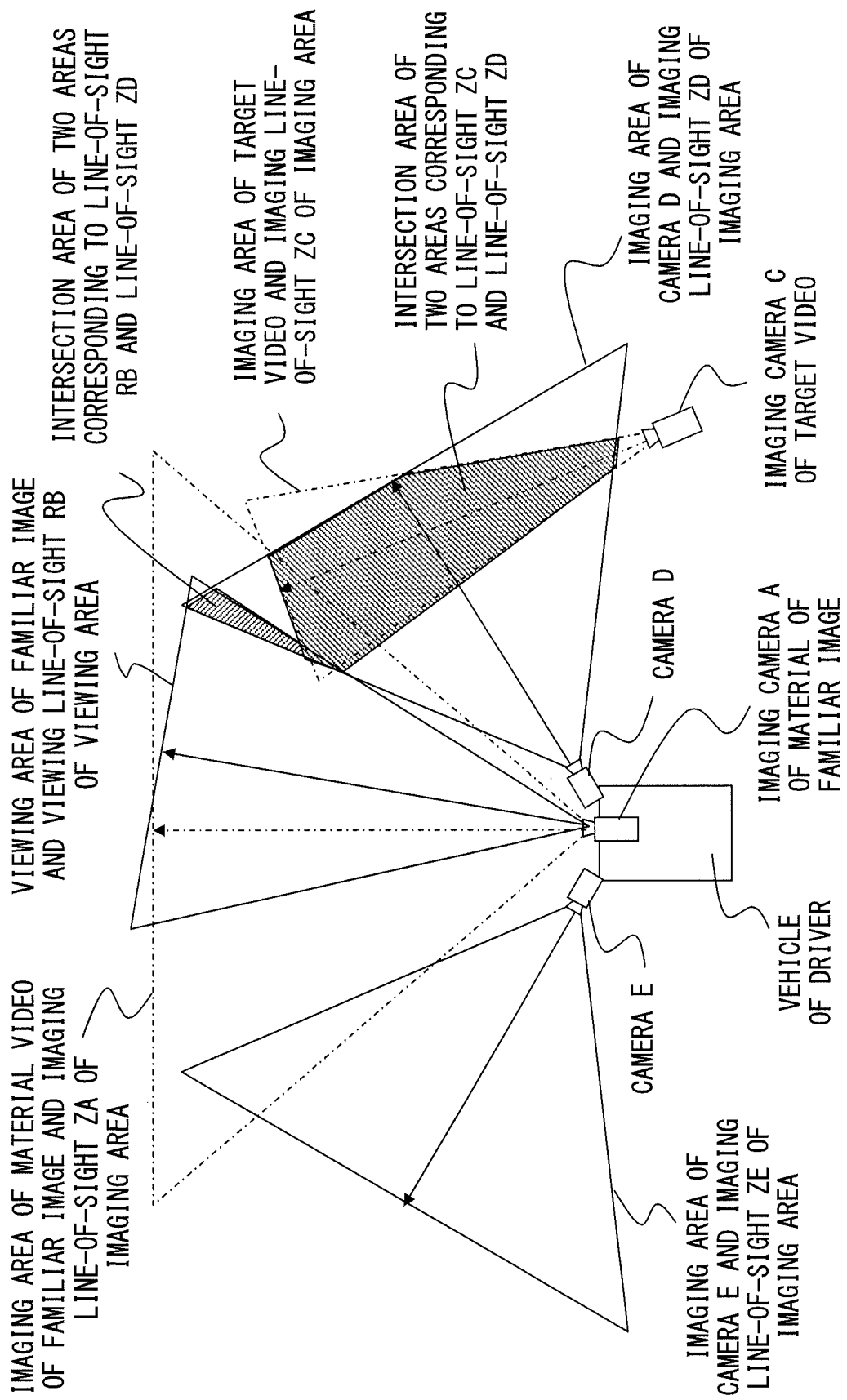
FIG. 16 is a diagram showing a first route information determination method.

FIG. 16 is a diagram showing the first route information determination method.

The example illustrates a case in which there are a video of the camera A mounted on the vehicle of the driver used for the familiar image, a target video (camera C), and videos of cameras D and E mounted on the vehicle of the driver to take images diagonally in front of the vehicle of the driver. To determine the route video and the route line-of-sight, the creation content determination unit 35a first uses intersections of viewing areas to check whether the same subjects as in the familiar image and the target video are depicted in the videos (videos of the cameras D and E) other than the video of the familiar image and the target video (S25).

Specifically, the creation content determination unit 35a calculates intersection areas of imaging areas of photographic lines-of-sight ZD and ZE of the cameras D and E relative to a viewing area of a pseudo driver line-of-sight B as the familiar image. Similarly, the creation content determination unit 35a also calculates intersection areas of imaging areas corresponding to a photographic line-of-sight ZC as the target video and the photographic lines-of-sight ZD and ZE of the cameras D and E. The intersection areas are calculated in the same method as C1 described in the intermediate video use determination unit 34a, the first calculation method of intersection rate, and the second calculation method of intersection rate. In this way, the creation content determination unit 35a calculates the proportions (intersection rates) of the intersection areas relative to all imaging areas to facilitate the comparison and holds the intersection rates as indices for the familiar images and the target videos of the videos.

If there are only videos in which the intersection rate is smaller than the threshold (S25, NO), there are no videos displaying the same subjects in both the familiar image and the target video. Therefore, the viewing process as in the drive supporting apparatus 1 is executed, in which the intermediate video using the route information is abandoned, and the intermediate video is not used (S29).

If there is a video in which the intersection rate is greater than the threshold (S25, YES), the same determination as the determination of C2 of FIG. 6 is further performed. Angles formed by the line-of-sight direction vectors with the camera photographic line-of-sight of the video and with both the lines-of-sight of the target video and the familiar image are examined to examine whether the formed angles, which serve as indices of whether the visibilities of the subjects are close, are smaller than the threshold, and a video with close visibility of subjects is selected (S26). If there is a video in which the formed angle is smaller than the threshold (S26, YES), it is determined to use an intermediate video that includes the camera photographic line-of-sight of the video and the video as the route line-of-sight and the route video (S28). If there is no video smaller than the threshold (S26, NO), the same viewing process as in the drive supporting apparatus 1 is executed, in which the intermediate video is not used, as in the case where the intersection rate is smaller than the threshold (S29). The process from the determination of the route information to the determination of the visibility of the subjects using the angle formed by the line-of-sight direction vector may be skipped.

In this way, the creation content determination unit 35a selects a video with the highest index relative to both the familiar image and the target video (the photographic line-of-sight ZD of the camera D in FIG. 16) as the route video in the creation of the intermediate image.

As a result, the intermediate image is created and presented, which is for ultimately converting the familiar image as the start image (video of a pseudo driver line-of-sight RB as the viewing line-of-sight and the imaging camera A) to the target video (target video of the photographic line-of-sight ZC and the imaging camera C) through the route video (video of the photographic line-of-sight ZD of another camera and the imaging camera D). Only the photographic line-of-sight ZD as the route line-of-sight may be selected and used without using the camera D video as a video related to the photographic line-of-sight ZD, and only the camera A video as a material of the familiar image and the target camera C video may be used in the creation of the intermediate image to change only the line-of-sight from the pseudo driver line-of-sight RB to the photographic line-of-sight ZD and to the photographic line-of-sight ZC. Conversely, only the video may be used without using the photographic line-of-sight of the video. However, there is less uncomfortable feeling in the visibility of the subjects in the generated image if the image is generated from a photographic line-of-sight close to the current viewing line-of-sight and from a video taken at the photographic line-of-sight. Therefore, it is desirable to use both the line-of-sight and the video. In this case, the use switch timing of the line of the sight and the video may not be the same, and there may be a time difference in the switching. The determination and calculation of the intersection area may be performed by a method different from C1 of the intermediate video use determination unit 34a.

Figure 17:
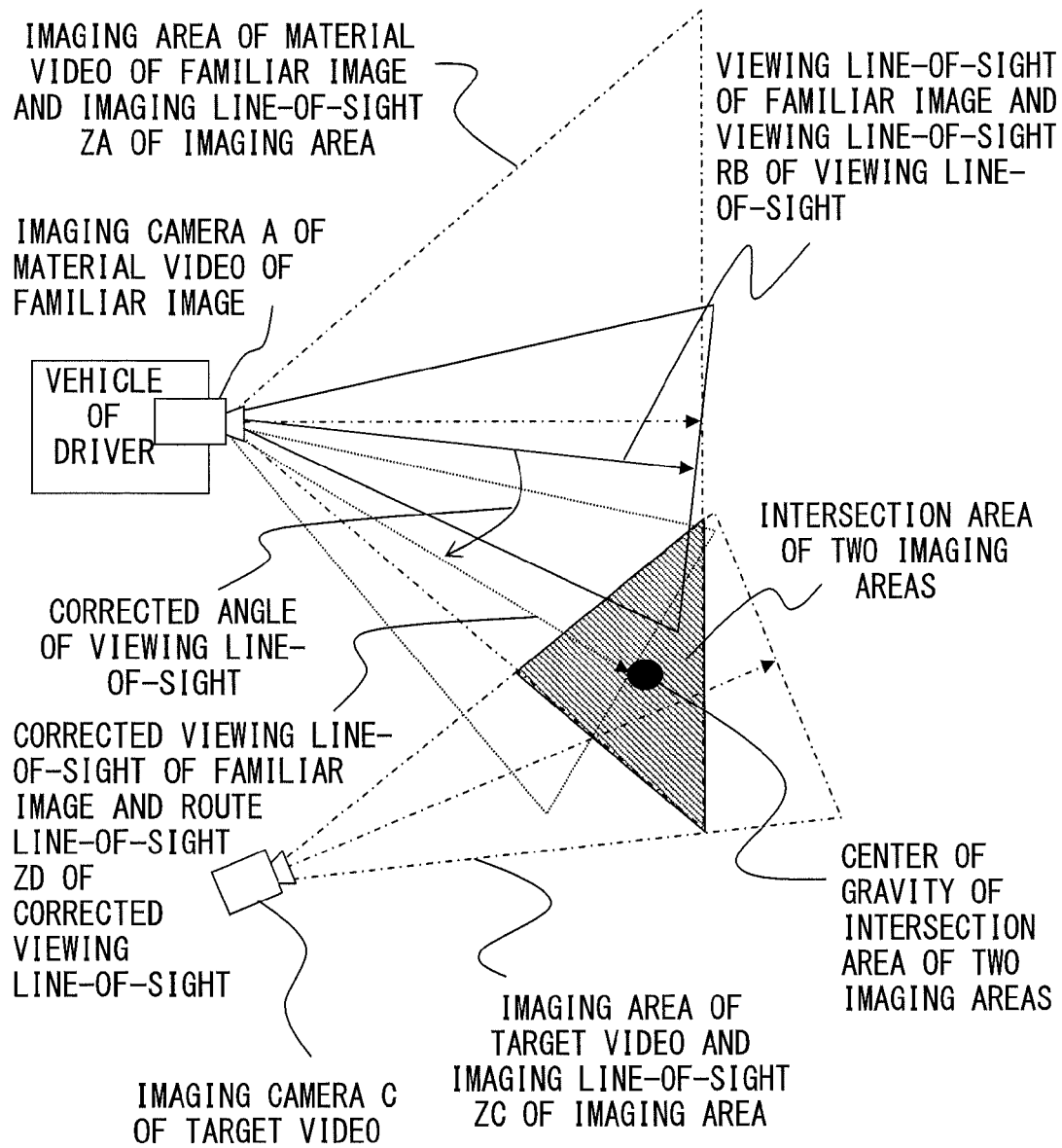
FIG. 17 is a diagram showing a second route information determination method.

FIG. 17 is a diagram showing the second route information determination method.

In this case, the creation content determination unit 35a uses a corrected familiar image as the route video, the corrected familiar image including a video used to create the familiar image and a corrected viewing line-of-sight in which the viewing line-of-sight of the familiar image is corrected.

The second route information determination method does not use the viewing area of the viewing line-of-sight of the familiar image (the pseudo driver line-of-sight RB as the viewing line-of-sight) unlike the first route information determination method. The second route information determination method compares the original imaging area (the photographic line-of-sight ZA) as the imaging camera line-of-sight of the material video used to create the familiar image and the imaging area (the photographic line-of-sight ZC) of the imaging camera line-of-view of the target video and uses a corrected viewing line-of-sight (route line-of-sight ZD) in which the line-of-sight direction of the viewing line-of-sight of the familiar image is corrected by setting the center of gravity of the intersection area as a fixation point for a better view of the part where the two imaging areas intersect. The image viewed at the corrected viewing line-of-sight (route line-of-sight ZD) is the route image, and the route image is used to create the intermediate image.

As a result, a line-of-sight changing path and videos from the pseudo driver line-of-sight RB and the video of the imaging camera A, to the route line-of-sight ZD and the video of the imaging camera A, and then to the photographic line-of-sight ZC and the target video of the imaging camera C are used to create the intermediate video. Although the line-of-sight direction is corrected here, a corrected viewing line-of-sight in which the viewpoint is moved to pass through the center of gravity of the intersection area may be used without changing the line-of-sight direction. Alternatively, the photographic line-of-sight A of the material video may certainly be used as the corrected viewing line-of-sight. In this case, a line-of-sight changing path and videos from the pseudo driver line-of-sight RB and the video of the imaging camera A, to the photographic line-of-sight ZA and the video of the imaging camera A, and then to the photographic line-of-sight ZC and the target video of the imaging camera C are used to create the intermediate image.

Figure 18:
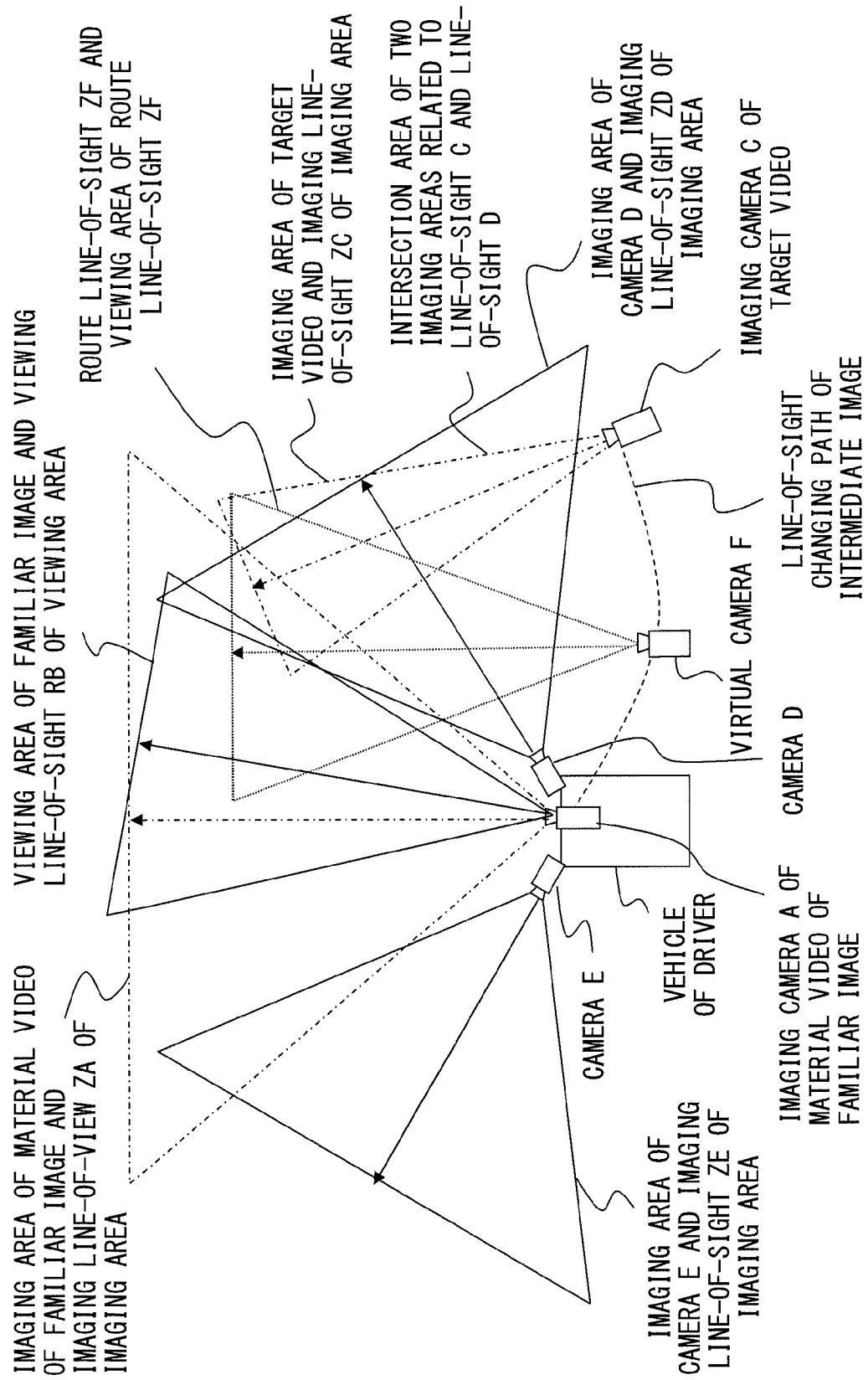
FIG. 18 is a diagram showing a third route information determination method.

FIG. 18 is a diagram showing the third route information determination method.

In the third route information determination method, intermediate lines-of-sight relative to the viewing line-of-sight RB of the familiar image and the photographic line-of-sight ZC of the target video are determined in advance, and the camera video of the photographic line-of-sight that best corresponds to the intermediate lines-of-sight is used as the route video. While the route video and the route line-of-sight are determined at the same time in the first route information determination method and the second route information determination method, the viewing line-of-sight of the route video is determined first and used to select the video in the third route information determination method. In the line-of-sight change of the viewing line-of-sight (the pseudo driver line-of-sight RB) of the familiar image and the viewing line-of-sight (the photographic line-of-sight ZC) of the target video, the creation content determination unit 35a first determines the line-of-sight changing path that gradually changes the line-of-sight parameters, such as the viewpoint, the line-of-sight direction, and the angle of view. An example of the most simple determination method of the changing path includes a method of linearly interpolating the values, or the line-of-sight changing path may be set to always pass through predetermined values.

If there is a virtual camera F of FIG. 18 as one of the route lines-of-sight on the thus determined line-of-sight changing path, the video viewed by a route line-of-sight ZF as a line-of-sight of the virtual camera F is determined as follows. The creation content determination unit 35a first compares the photographic lines-of-sight (the photographic line-of-sight ZA, the photographic line-of-sight ZC, the photographic line-of-sight ZD, and the photographic line-of-sight ZE) of all videos including the material video of the familiar image and the target video with the route line-of-sight ZF. In the comparison of the lines-of-sight, the creation content determination unit 35a selects a video with a photographic line-of-sight that views as many subjects as possible from a similar line-of-sight. Specifically, the creation content determination unit 35a uses C1 and C2 described in the intermediate video use determination unit 34a to use the intersection rate of the imaging area for estimating the proportion of common subjects, the angle formed by the photographic line-of-sight vector for estimating the appearances of the common subjects, and so on, to preferentially select a video with a high intersection rate and with a small angle formed by the photographic line-of-sight vector.

In the example of FIG. 18 of the third route information determination method, the intersection rate is large in the order of the camera D, the camera A, and the camera C. Meanwhile, the angle formed by the photographic line-of-sight vector is small in the order of the camera A, the camera C, the camera E, and the camera D. In such a case, the creation content determination unit 35a ranks the determination of the intersection rate and the angle formed by the photographic line-of-sight vector from 1 and selects a video (the camera A in the example) with the smallest multiplication result of both ranks as a preferential video.

As a result, the intermediate image is created in a changing path from the pseudo driver line-of-sight RB and the video of the imaging camera A, to the route line-of-sight ZF and the video of the imaging camera A, and then to the target line-of-sight and the target video of the imaging camera C. The route video could well be different in each route line-of-sight. Therefore, it is desirable to reduce the number of route lines-of-sight for selecting the video to prevent a bewildering intermediate video in which the route video continuously changes. In this way, the creation content determination unit 35a uses the route information determination method to determine what kind of route video and route line-of-sight will be used to create the intermediate video that connects the familiar image and the target video.

If possible, the creation content determination unit 35a may present the user with information, such as an index as a hint of selection, along with candidates of the route video and the route line-of-sight, and the user may explicitly make the selection. In this case, the creation content determination unit 35a may arrange and display the videos and the lines-of-sight as the candidates of the route video and the line-of-sight in the order of effectiveness based on the indices or may display a schematic diagram as in FIGS. 16 to 18 showing intersection areas of imaging areas, differences in line-of-sight directions, and so on. If necessary, the creation content determination unit 35a may further assist the selection using colors, enhancement marks, and so on, that can identify effective indices. Specifically, to assist the selection, the imaging area of the video is painted by a darker color than the other areas, the imaging area is surrounded by a conspicuous color such as red or by a thick line, or a mark in a size and color more conspicuous compared to the other areas is used in the schematic diagram to indicate the position of the imaging camera.

In an identification method on a list, the creation content determination unit 35a may arrange and display actually received video images in the order of effectiveness along with index values that serve as reasons for determining the effectiveness. The list or the schematic diagram for selecting the route video and the line-of-sight, particularly the list or the schematic diagram using indices, and so on, for comparing the appearances in the familiar image and the video group, may be utilized as a list or a diagram for the user to explicitly select the target video from a plurality of target video candidates corresponding to the driving scene in the video change determination unit 14.

The creation content determination unit 35a further determines the necessity of the enhancement display of the vehicle of the driver, the subjects, and so on. The enhancement display is a display for enhancing the locations of the vehicle of the driver or predetermined surrounding subjects in the presentation of the intermediate video so that the user can more easily figure out the positional relationship between the vehicle of the driver and the surrounding subjects. The creation content determination unit 35a determines whether to perform the enhancement display and determines an enhancement target as well as an enhancement method.

The enhancement target is, for example, an object that particularly requires attention, such as an obstacle whose position is estimated by radar, and so on, or the vehicle of the driver that serves as a standard for figuring out the position. A first enhancement method and a second enhancement method will be described as examples of the enhancement method.

In the first enhancement method, a special three-dimensional shape (such as a three-dimensional arrow shape pointing the enhancement target, a translucent circle shape surrounding the enhancement target, and a simple model shape of the enhancement target) is arranged in a space of a projection shape near the enhancement target during the creation of the intermediate video, and the shape is viewed from the viewing line-of-sight along with the projection shape. In the second enhancement method, an image area in each video where the enhancement target would exist is estimated from the position of the enhancement target, the photographic line-of-sight of the video, and the imaging area. The luminance, the color, the transparency, and so on, of pixels of part or all of the area or pixels near the area are directly changed to distinguish the area from the other areas, or a predetermined marker image is superimposed to obtain an enhanced video in which the image area related to the enhancement target is changed, and then the image is projected in a projection shape. The first enhancement method is a CG-type method for appropriately arranging the three-dimensional shape for enhancement in the virtual space including the projection shape. The second enhancement method is a method for applying the enhancement process in advance to the video.

It is assumed here that the enhancement target is the vehicle of the driver, and an example of a result of the first enhancement method for arranging a three-dimensional shape (vehicle shape) as an enhanced shape will be illustrated.

FIG. 19 is a diagram showing a result of the first enhancement method for an image in which the external camera A video and the camera B video are projected in a projection shape.

The upper image of FIG. 19 is an image without an enhanced shape, and the lower image is an image with an enhanced shape. FIG. 19 shows an image viewed from the back of the vehicle of the driver in which the external camera A video as the target video and the camera B video mounted on the vehicle of the driver used to create the familiar image are projected in a projection shape to allow viewing the vehicle of the driver as the enhancement target. In FIG. 19, the projection of the camera B video is overwritten by the projection of the external camera A video in an imaging area common to the two videos, and video merging for merging the luminance and color of the videos is not precisely used. FIG. 19 is illustrated as a scheme or summary of the intermediate video.

FIG. 20 is a diagram showing a result of the first enhancement method for an image in which the external camera A video is projected in a projection shape.

The upper image of FIG. 20 is an image without an enhanced shape, and the lower image is an image with an enhanced shape. In FIG. 20, only the external camera A video is projected, and an image viewed from the imaging viewpoint of the external camera A video is illustrated.

FIG. 21 is a diagram showing a result of the first enhancement method for an image in which the camera B video is projected in a projection shape.

The upper image of FIG. 21 is an image without an enhanced shape, and the lower image is an image with an enhanced shape. FIG. 21 shows the familiar image using the camera B video.

The image of the vehicle of the driver as the enhancement target is not displayed in an image of the pseudo driver line-of-sight more accurately simulating the driver line-of-sight. Therefore, the example of the result of the first enhancement method shows an image viewed by moving the viewpoint of the pseudo driver line-of-sight a little above the vehicle of the driver. As can be understood from the example of the result of the first enhancement method, the enhancement process of the vehicle of the driver allows the user to quickly figure out the location of a target object of the enhancement process, i.e. the vehicle of the driver where the viewer exists, in the video throughout the intermediate video.

If the presentation method determination unit 15a selects a presentation method for displaying the target video on a predetermined display area of the display 18 without using the intermediate video, the video display unit 16 displays the target video in accordance with the presentation method (S5).

When the presentation method determination unit 15a determines to use the intermediate video, the projection display unit 17a executes a process by the intermediate video creation unit 36a and the projection creation unit 33a. If the intermediate video creation unit 36a is not involved, the projection creation unit 33a uses the viewing line-of-sight of the target video determined by the presentation method determination unit 15a to project the target video in a predetermined projection shape to create the viewing image viewed from the viewing line-of-sight.

The intermediate video creation unit 36a uses the content determined by the presentation method determination unit 15a to gather calculations or data necessary to create the intermediate video to assist creating the intermediate video when the projection creation unit 33a actually creates the video. More specifically, the intermediate video creation unit 36a uses the video (camera B video) and the viewing line-of-sight (pseudo driver line-of-sight F1) for creating the familiar image, the line-of-sight interpolating method in creating the intermediate video (linear interpolation of line-of-sight position, direction, and angle of view), the necessity of video merging and the video merging method (a blend using the transparency of image when there is video merging), the necessity of enhancement display and the enhancement method of the vehicle of the driver and the subjects (enhancement display based on the model shape of the vehicle of the driver), the route video, the route line-of-sight, and so on, to change the data for creating the intermediate video presented in the change from the familiar image to the target video (S9).

The use line-of-sight changing unit 41a performs interpolation in changing the viewing line-of-sight in the creation of the intermediate video to determine the current viewing line-of-sight. The use video merging unit 42a gathers use videos to calculate and hold the projection information related to the videos, i.e. current transparency of video, order of projection, and so on, to actually process the video merging method of video to be used. During the display of the intermediate video (S10, YES), if the enhancement is necessary (S11, YES), the enhancement processing unit 43a executes a process of adding a three-dimensional shape for performing the enhancement display at the position of the enhancement target or of enhancing part of the video (S12). Details of the components of the intermediate video creation unit 36a are as already described in the presentation method determination unit 15a, and so on.

If the intermediate video is not used (S10, NO), the projection creation unit 33a uses the same technique as the projection creation unit 33 (S13). If the intermediate video is used, the projection creation unit 33a uses the result of the process and data change by the intermediate video creation unit 36a to project one or more videos in a predetermined three-dimensional shape (projection shape) while referencing the photographic line-of-sight parameters to create an image viewed from the current viewing line-of-sight (S14). Since the intermediate video is added, the projection creation unit 33a may newly adopt a concept of transparency, adopt a projection shape for enhancement process, or simultaneously display videos with significantly different photographic lines-of-sight. The projection creation unit 33a executes, for example, a process like transmission mapping in the CG to determine the color and the luminance of the feature point of the projection shape by taking into account the transparency and the order of the projection from the pixel colors and the luminance of a plurality of associated videos.

Since a plurality of shapes (enhanced shapes) for which the videos are not projected in the virtual space to be viewed may temporarily exist, the projection creation unit 33a prepares an enhanced shape group that may be used and manages data by registering or deleting, in a use shape list in the virtual space, the enhanced shapes that will not be projected.

The projection creation unit 33a simultaneously projects videos with different photographic lines-of-sight in a projection shape, such as two videos including a video for creating the familiar image (often a video of the camera mounted on the vehicle of the driver in which the photographic line-of-sight, i.e. the viewpoint, similar to the line-of-sight of the user as the driver or the viewer is near the vehicle of the driver) and a target video based on a predetermine photographic line-of-sight. For example, if the imaging viewpoint or the browsing viewpoint of the target video are outside the projection shape, i.e. on the opposite side of the vehicle of the driver and the viewpoint of the user, the viewpoint path crosses the projection shape when the line-of-sight interpolation method is performed from the pseudo line-of-sight of the user as the familiar image to the line-of-sight of the target video, and the calculation of the projection is difficult. To solve this, the projection creation unit 33a may devise the projection shape or the projection method by enlarging the projection shape in consideration of the line-of-sight of the target video, changing the shape to include the viewpoint of the target video, or virtually changing the size of the projection shape by devising the projection formula instead of changing the projection shape.

Additionally, to prevent the overlapped projection of a three-dimensional subject on the side of the projection shape across connections of videos of the vehicle of the driver or to prevent the generation of an area where the subject cannot be projected in the projection shape during the projection, the projection creation unit 33a can use a shape suitable for the projection with a virtually changed size or shape to calculate the projection to restore the size or shape suitable for display after the projection. As for the videos outside the vehicle of the driver, the projection creation unit 33a can skip the calculation by determining not to precisely consider the connections and the areas where the projection is not possible or may use a projection calculation different from that for the videos of the vehicle of the driver.

Although the process of the intermediate video creation unit 36a and the process of the projection creation unit 33a are separately described for the convenience in relation to the projection display unit 17a, the processes may be executed at the same time, or the order of the processes may be changed. For example, the process of the use video merging unit 42a may be executed before the process of the use line-of-sight changing unit 41a.

Figure 22:
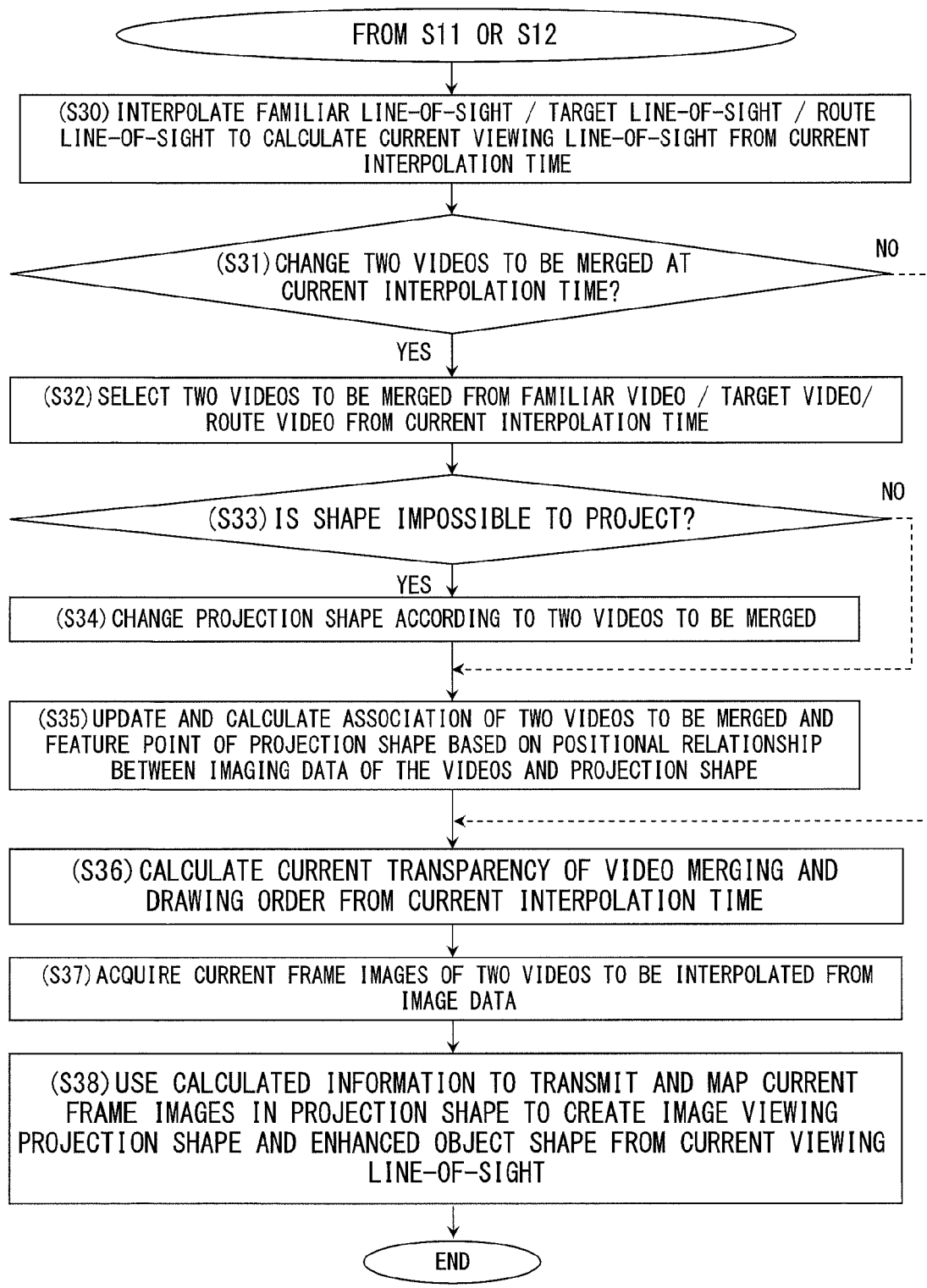
FIG. 22 is a flow chart showing an example of an operation of intermediate video creation.

FIG. 22 is a flow chart showing an example of an operation of intermediate video creation.

An example of a flow of the detailed process of the projection display unit 17a is as illustrated in the flow chart of intermediate video creation of FIG. 22. The projection display unit 17a interpolates and calculates the viewing line-of-sight from an interpolation time that is a current video time of the intermediate video (S30), determines whether to switch the video to be merged (S31), and if the video to be merged is to be switched (S31, YES), selects a merge target (S32). The projection display unit 17a then determines whether the projection shape needs to be updated based on the video to be projected as described above (S33), and if the projection shape needs to be updated (S33, YES), updates the projection shape in accordance with the image data (imaging space) of the merged two videos to be projected (S34). After S34 or after NO of S33, the projection display unit 17a associates the pixel position of the video frame with the feature point of the projection shape obtained from the positional relationship between the imaging data (imaging space) of the merged two videos to be projected and the projection shape (S35). The association is the same as the association of the projection creation unit 33 of the drive supporting apparatus 1, and the result of the previous association can be utilized if there is no change in the video and the projection shape. After S35 or after NO of S31, the projection display unit 17a changes and updates the transparency of each video during superimposed display that is a degree of video merging based on the current interpolation time and changes and updates the projection drawing order of the videos if necessary (S36). Lastly, the projection display unit 17a acquires a video frame image of the actual video from the video data 23 (S37) and creates an image viewed from the current viewing line-of-sight based on the pixel color and luminance of the video frame image acquired using the transmission mapping (S38).

Hardware resources as storage media, such as a CPU, a memory, and a hard disk drive, and software resources held in the storage media cooperate to realize the components of the drive supporting apparatus 1a.

The drive supporting apparatus 1a creates and displays the intermediate video as a video in transition from the familiar image (often an image using the pseudo driver line-of-sight simulating the line-of-sight of the user), for which the user would be familiar with the position relationship between the subjects, to the target video before the user views the target video. This can solve a problem that the user cannot quickly figure out the positional relationship in the display of a video, such as an infrastructure imaging video (camera photographic line-of-sight) that is significantly different from the video (user line-of-sight) visually observed by the user.

The drive supporting apparatus 1a gradually changes the line-of-sight from the line-of-sight based on the user to the line-of-sight of a video viewed from the outside and changes the used video from the video of the photographic line-of-sight close to the assumed line-of-sight of the user to the target video. This can change the viewing line-of-sight while gradually changing the visibility of the subjects. As a result, the user can easily figure out which subject is a subject in naked eyes and figure out the positional relationship between the subjects and between the user and the subjects.

If an existing video switching effect of simply merging the videos is used in changing the videos, the color of the entire video is mixed without taking into account where and what is displayed when two videos with different positions of subjects are used in the first video and the target video. Therefore, the same subject appears at a plurality of locations, and the subjects are not associated at all. The videos cannot be used to figure out the positions of the subjects. The drive supporting apparatus 1a arranges the videos by taking into account the relationship between the imaging spaces to mix the color to merge the videos while maintaining the same subjects at the same locations. The drive supporting apparatus 1a projects the video in a projection shape from the position where the video is taken and changes the transparency so as to gradually change the video on the projection shape to mix the color. In this way, the arrangement of the same subjects at the same locations before and after the change of the video is realized. In this method, the same subjects are projected at the same positions even in videos with totally different imaging positions, and the method can create a video that assists the user to figure out the positions of the subjects.

As in the example, the drive supporting apparatus 1a sets the viewing line-of-sight of the start image as a pseudo driver line-of-sight and sets the viewing line-of-sight of the target image as a line-of-sight different from the pseudo driver line-of-sight. This can assist the user to recognize the image particularly when the line-of-sight is switched from the line-of-sight of the user to a line-of-sight significantly different from the line-of-sight of the user. Meanwhile, the drive supporting apparatus 1a may set the viewing line-of-sight of the start image to a line-of-sight different from the pseudo driver line-of-sight and may set the viewing line-of-sight of the target image as the pseudo driver line-of-sight. This can assist the user to recognize the image particularly when the line-of-sight is switched from a line-of-sight significantly different from the line-of-sight of the user to the line-of-sight of the user.

The driver supporting apparatus 1a may make the line-of-sight parameters of at least one of the viewing line-of-sight of the start image and the viewing line-of-sight of the target video equal to part or all of the line-of-sight parameters (viewpoint, line-of-sight direction, angle of view) of the pseudo driver line-of-sight.

The drive supporting apparatus 1a may compare the viewing line-of-sight and the pseudo driver line-of-sight to add information indicating a difference between the lines-of-sight obtained by the comparison, and so on, to the displayed image.

The present invention can also be applied in the following computer system.

Figure 23:
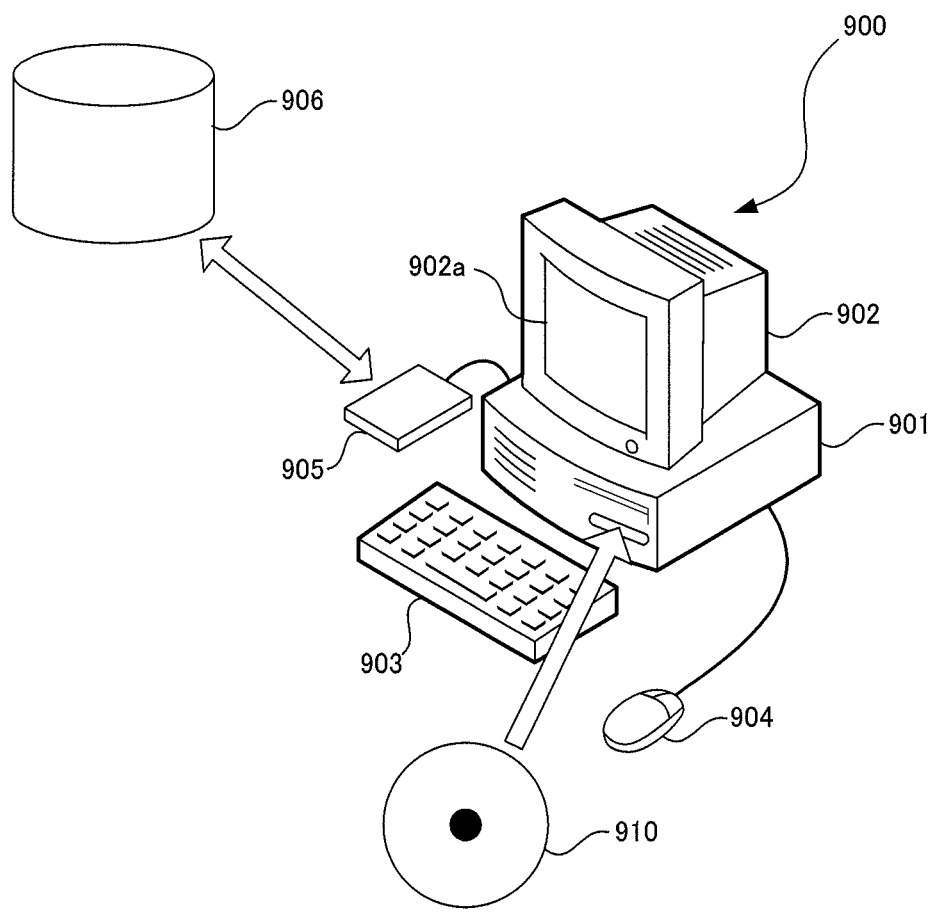
FIG. 23 is a diagram showing an example of a computer system to which the present invention is applied.

FIG. 23 is a diagram showing an example of the computer system to which the present invention is applied.

A computer system 900 shown in FIG. 23 includes a main body 901 including a CPU, a disk driver, and so on, a display 902 that displays an image based on an instruction from the main body 901, a keyboard 903 for inputting a variety of information to the computer system 900, a mouse 904 for designating an arbitrary position on a display screen 902a of the display 902, and a communication device 905 that accesses an external database, and so on, to download a program stored in another computer system, and so on. Examples of the communication device 905 include a network communication card and a modem.

According to the disclosed image processing apparatus, image processing program, and image processing method, the recognition of the display image by the user during switching of cameras can be assisted.

A program for causing the computer system constituting the image processing apparatus to execute the steps described above can be provided as an image processing program. The program can be stored in a computer-readable recording medium by the computer system to cause the computer system constituting the image processing apparatus to execute the steps described above. The program for executing the steps described above is stored in a portable recording medium, such as a disk 910, or the communication device 905 downloads the program from a recording medium 906 of another computer system. The image processing program for providing the computer system 900 with at least an image processing function is inputted and compiled in the computer system 900. The program causes the computer system 900 to operate as an image processing system with the image processing function. The program may be stored in a computer-readable recording medium such as the disk 910. Examples of the recording medium that can be read by the computer system 900 include an internal storage device arranged inside the computer, such as a ROM and a RAM, a portable storage medium, such as the disk 910, a flexible disk, a DVD disk, a magneto-optical disk, and an IC card, a database that holds computer programs, another computer system, a database of the other computer system, and various recording media that can be accessed by the computer system connected through communication means such as the communication device 905.

Part of the image processing program may be realized by a dedicated processing chip as hardware embedded in the computer system 200.

An image acquisition unit corresponds to the video update registration unit 11a according to the embodiment.

A setting unit corresponds to the video change determination unit 14 and the presentation method determination unit 15a according to the embodiment.

A generation unit corresponds to the projection display unit 17a according to the embodiment.

A condition acquisition unit corresponds to the driving condition acquisition unit 12 and the road condition acquisition unit 13 according to the embodiment.

A display unit corresponds to the display 18 according to the embodiment.

A first camera corresponds to the camera B according to the embodiment.

A second camera corresponds to the external camera A according to the embodiment.

A first photograph image corresponds to the camera B video according to the embodiment.

A second photograph image corresponds to the external camera A video according to the embodiment.

A first photographic line-of-sight corresponds to the camera B line-of-sight according to the embodiment.

A second photographic line-of-sight corresponds to the external camera A line-of-sight according to the embodiment.

A first display image corresponds to VD(t0) according to the embodiment.

A second display image corresponds to VD(t3) according to the embodiment.

An interpolation display image corresponds to VD(t1) and VD(t2) according to the embodiment.

A generation condition corresponds to C3 and C4 according to the embodiment.

The present invention can be implemented in various other forms without departing from the spirit and main features of the present invention. Therefore, the embodiment is just an illustration in all aspects, and the embodiment should not be interpreted restrictively. The scope of the present invention is indicated by the claims and is not restrained by the specification in any way. All changes, various modifications, substitutions, and alterations belonging to the range of equivalency of the claims are all within the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus arranged on a vehicle, the image processing apparatus comprising:

an image acquisition unit that acquires camera images taken by a first camera and a second camera;

a setting unit that sets a correspondence between a position of a subject in a first camera image, a position of the subject in a second camera image, a position in a first display image, and a position of the subject in a second display image on the basis of a first camera line-of-sight that is a line-of-sight of the first camera image taken by the first camera, a first display line-of-sight that is a line-of-sight of the first display image generated based on the first camera image, a second camera line-of-sight that is a line-of-sight of the second camera image taken by the second camera, and a second display line-of-sight that is a line-of-sight of the second display image generated based on the second camera image; and a generating unit that generates the first display image based on the first camera image and the correspondence, generates an interpolation display image displayed later than the first display image by interpolating between the first display image and the second display image based on the correspondence and at least one of the first camera image and the second camera image, and generates the second display image displayed later than the interpolation display image based on the second camera image and the correspondence, wherein the lines-of-sight of at least one of a pair of the first camera line-of-sight and the first display line-of-sight and a pair of the second camera line-of-sight and the second display line-of-sight are different from each other, the first display line-of-sight and the second display line-of-sight are different from each other, the setting unit sets a projection shape for projecting the first camera image and the second camera image based on the correspondence and sets the interpolation display line-of-sight that is the line-of-sight of the interpolation display image based on at least one of the first display line-of-sight and the second display line-of-sight, and the generating unit projects the first camera image to the projection shape to set a first projection result, generates the first display image viewing the first projection result from the first display line-of-sight, projects at least one of the first camera image and the second camera image to the projection shape to set a second projection result, generates the interpolation display image viewing the second projection result from the interpolation display line-of-sight, projects the second camera image to the projection shape to set a third projection result, and generates the second display image viewing the third projection result from the second display line-of-sight.

2. The image processing apparatus according to claim 1, wherein the generation unit weights the first camera image and the second camera image, decreases the weight of the first camera image with time, increases the weight of the second camera image with time, and generates the interpolation display image based on the weighted first camera image and the weighted second camera image.

3. The image processing apparatus according to claim 1, wherein at least one of the first display line-of-sight and the second display line-of-sight is a line-of-sight obtained by applying a predetermined operation to a line-of-sight of a user of the image processing apparatus.

4. The image processing apparatus according to claim 3, wherein the line-of-sight includes line-of-sight parameters that are a viewpoint, a direction, and an angle of view, and at least one of the line-of-sight parameters of at least one of the first display line-of-sight and the second display one-of-sight and the line-of-sight of the user is identical.

5. The image processing apparatus according to claim 3, wherein the setting unit executes at least one of a process of selecting the first camera based on a line-of-sight of the first camera, a line-of sight of the second camera and the first display line-of-sight and a process of selecting the second camera based on the light-of-sight of the first camera, the line-of sight of the second camera and the second display line-of-sight.

6. The image processing apparatus according to claim 3, wherein the generating unit adds, to the display image, information based on comparison between the lines-of-sight of the display images, which are the first display image, the interpolation display image, and the second display image, and the line-of-sight of the user.

7. The image processing apparatus according to claim 1, wherein a projection method set by the setting unit when the first camera and the second camera are arranged on the vehicle and the projection method set by the setting unit when at least one of the first camera and the second camera is arranged outside the vehicle are different.

8. The image processing apparatus according to claim 1, wherein the setting unit includes a positional relationship between the projection shape and a specific object in the correspondence, and the generating unit arranges an object shape indicating the object in a space of the projection shape based on the positional relationship and generates the first display image, the interpolation display image, and the second display image displaying the projection shape and the object shape.

9. The image processing apparatus according to claim 1, wherein the setting unit estimates a position of the subject taken by the cameras based on at least one of the camera images and the viewpoints of the camera images and includes the position in the correspondence, and the generating unit enhances the position of the subject in the first display image, the interpolation display image, and the second display image based on the correspondence.

10. The image processing apparatus according to claim 1, wherein the setting unit includes a position of the vehicle in the correspondence based on the lines-of-sight of the camera images, and the generating unit enhances the position of the vehicle in the first display image, the interpolation display image, and the second display image based on the correspondence.

11. The image processing apparatus according to claim 1, wherein if the setting unit determines that a difference between the line-of-sight of the user viewing the displayed image and one of the first display image and the second camera line-of-sight is out of a predetermined range, or if the setting unit determines that an area around the line-of-sight of the user viewing the displayed image and one of an area around the first display image and an area around the second camera line-of-sight overlap each other, the generating unit generates the interpolation display image.

12. The image processing apparatus according to claim 1, further comprising a condition acquisition unit that acquires at least one of a driving condition of the vehicle and a road condition around the vehicle, wherein the setting unit selects at least one of the first camera and the second camera from the multiple cameras based on at least one of the driving condition and the road condition.

13. The image processing apparatus according to claim 12, wherein the setting unit determines the space to be displayed based on at least one of the driving condition and the road condition, determines the space to be imaged based on the line-of-sight of the first camera, the line-of sight of the second camera, and selects the second camera from the multiple cameras based on the overlap between the space to be displayed and the space to be imaged.

14. The image processing apparatus according to claim 12, wherein if the setting unit determines that at least one of the driving condition and the road condition satisfies a predetermined generation condition, the generation unit generates the interpolation display image.

15. The image processing apparatus according to claim 1, further comprising a display unit that sequentially displays the first display image, the interpolation display image, and the second display image generated by the generation unit.

16. A non-transitory computer-readable recording medium recording an image processing program executed by a computer arranged on a vehicle, the image processing program comprising:

acquiring camera images taken by each of multiple cameras including a first camera and a second camera;

setting a correspondence between a position of a subject in a first camera image, a position of the subject in a first display image, a position of the subject in a second camera image, and a position of the subject in a second display image on the basis of a first camera line-of-sight that is a line-of-sight of the first camera image taken by the first camera, a first display line-of-sight that is a line-of-sight of the first display image generated based on the first camera image, a second camera line-of-sight that is a line-of-sight of the second camera image taken by the second camera, and a second display line-of-sight that is a line-of-sight of the second display image generated based on the second camera image;

generating the first display image based on the first camera image and the correspondence;

generating an interpolation display image displayed later than the first display image by interpolating between the first display image and the second display image based on the correspondence and at least one of the first camera image and the second camera image; and generating the second display image displayed later than the interpolation display image based on the second camera image and the correspondence, wherein the lines-of-sight of at least one of a pair of the first camera line-of-sight and the first display line-of-sight and a pair of the second camera line-of-sight and the second display line-of-sight are different from each other, the first display line-of-sight and the second display line-of-sight are different from each other, the setting sets a projection shape for projecting the first camera image and the second camera image based on the correspondence and sets the interpolation display line-of-sight that is the line-of-sight of the interpolation display image based on at least one of the first display line-of-sight and the second display line-of-sight, and the generating projects the first camera image to the projection shape to set a first projection result, generates the first display image viewing the first projection result from the first display line-of-sight, projects at least one of the first camera image and the second camera image to the projection shape to set a second projection result, generates the interpolation display image viewing the second projection result from the interpolation display line-of-sight, projects the second camera image to the projection shape to set a third projection result, and generates the second display image viewing the third projection result from the second display line-of-sight.

17. An image processing method executed by an image processing apparatus arranged on a vehicle, the image processing method comprising:

acquiring camera images taken by a first camera and a second camera;

setting a correspondence between a position of a subject in a first camera image, a position of the subject in a first display image, a position of the subject in a second camera image, and a position of the subject in a second display image on the basis of a first camera line-of-sight that is a line-of-sight of the first camera image taken by the first camera, a first display line-of-sight that is a line-of-sight of the first display image generated based on the first camera image, a second camera line-of-sight that is a line-of-sight of the second camera image taken by the second camera, and a second display line-of-sight that is a line-of-sight of the second display image generated based on the second camera image;

generating the first display image based on the first camera image and the correspondence;

generating an interpolation display image displayed later than the first display image by interpolating between the first display image and the second display image based on the correspondence and at least one of the first camera image and the second camera image; and generating the second display image displayed later than the interpolation display image based on the second camera image and the correspondence, wherein the lines-of-sight of at least one of a pair of the first camera line-of-sight and the first display line-of-sight and a pair of the second camera line-of-sight and the second display line-of-sight are different from each other, the first display line-of-sight and the second display line-of-sight are different from each other, the setting sets a projection shape for projecting the first camera image and the second camera image based on the correspondence and sets the interpolation display line-of-sight that is the line-of-sight of the interpolation display image based on at least one of the first display line-of-sight and the second display line-of-sight, and the generating projects the first camera image to the projection shape to set a first projection result, generates the first display image viewing the first projection result from the first display line-of-sight, projects at least one of the first camera image and the second camera image to the projection shape to set a second projection result, generates the interpolation display image viewing the second projection result from the interpolation display line-of-sight, projects the second camera image to the projection shape to set a third projection result, and generates the second display image viewing the third projection result from the second display line-of-sight.

* * * * *

UNITED STATES PATENT AND TRADEMARK OFFICE
CERTIFICATE OF CORRECTION

PATENT NO. : 8,773,534 B2
APPLICATION NO. : 13/242480
DATED : July 8, 2014
INVENTOR(S) : Asako Kitaura et al.

It is certified that error appears in the above-identified patent and that said Letters Patent is hereby corrected as shown below:

In the Claims

Column 31, Line 43, In Claim 5, delete "of sight" and insert -- of-sight --, therefor.

Column 31, Line 46, In Claim 5, delete "of sight" and insert -- of-sight --, therefor.

Column 32, Line 49, In Claim 13, delete "of sight" and insert -- of-sight --, therefor.

Signed and Sealed this
Seventh Day of April, 2015

Michelle K. Lee
*Director of the United States Patent and Trademark Office*